(12) United States Patent
Send et al.

(10) Patent No.: US 11,796,713 B2
(45) Date of Patent: Oct. 24, 2023

(54) DEVICE AND METHOD FOR OPTICALLY SURVEILLING AT LEAST ONE AREA

(71) Applicant: trinamiX GmbH, Ludwigshafen am Rhein (DE)

(72) Inventors: Robert Send, Karlsruhe (DE); Celal Mohan Oeguen, Ludwigshafen (DE); Ingmar Bruder, Ludwigshafen (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 142 days.

(21) Appl. No.: 17/263,977

(22) PCT Filed: Aug. 6, 2019

(86) PCT No.: PCT/EP2019/071132
§ 371 (c)(1),
(2) Date: Jan. 28, 2021

(87) PCT Pub. No.: WO2020/030646
PCT Pub. Date: Feb. 13, 2020

(65) Prior Publication Data
US 2021/0302617 A1 Sep. 30, 2021

(30) Foreign Application Priority Data
Aug. 7, 2018 (EP) .................... 18187676

(51) Int. Cl.
*G01V 8/22* (2006.01)
*F16P 3/14* (2006.01)
(52) U.S. Cl.
CPC ................ *G01V 8/22* (2013.01); *F16P 3/144* (2013.01)

(58) Field of Classification Search
CPC .................................. G01V 8/22; F16P 3/144
See application file for complete search history.

(56) References Cited

U.S. PATENT DOCUMENTS 7,667,185 B2    2/2010  Hippenmeyer et al.
2008/0123084 A1*  5/2008  Hippenmeyer .......... G01V 8/10
                                                            356/73

(Continued)

FOREIGN PATENT DOCUMENTS

DE    102005033349 A1    11/2008
DE    102016122364 A1    5/2018

(Continued)

OTHER PUBLICATIONS

R.A. Street: Technology and Applications of Amorphous Silicon, Springer-Verlag Heidelberg, 2010, pp. 346-349.

(Continued)

*Primary Examiner* — Thanh Luu
(74) *Attorney, Agent, or Firm* — Armstrong Teasdale LLP

(57) ABSTRACT

Described herein is a device for optically surveilling at least one area. The device includes a sender unit and a receiver unit. The sender unit has at least one illumination source. The illumination source is designed to generate at least one light beam having a beam profile. Each light beam is designated for propagating to the receiver unit, thereby traversing at least one area for surveillance. The receiver unit includes
 at least one transfer device,
 at least two optical sensors, and
 at least one evaluation device.

20 Claims, 2 Drawing Sheets

(56) References Cited

U.S. PATENT DOCUMENTS

2008/0173831 A1* 7/2008 Wuestefeld .............. G01V 8/20
250/551
2008/0284594 A1* 11/2008 Meyer ...................... G01B 9/08
340/541
2009/0295577 A1 12/2009 Yamaguchi

FOREIGN PATENT DOCUMENTS

| EP | 1246148 A2 | 10/2002 |
| JP | 54-26760 | 2/1979 |
| JP | 201038588 A | 2/2010 |
| WO | 2012110924 A1 | 8/2012 |
| WO | 2014097181 A1 | 6/2014 |
| WO | 2014198629 A1 | 12/2014 |
| WO | 2015024871 A1 | 2/2015 |
| WO | 2018091638 A1 | 5/2018 |
| WO | 2018091640 A2 | 5/2018 |
| WO | 2018091649 A1 | 5/2018 |

OTHER PUBLICATIONS

International Search Report and Written Opinion for corresponding PCT/EP2019/071132 dated Oct. 14, 2019, 14 Pages.

\* cited by examiner

DEVICE AND METHOD FOR OPTICALLY SURVEILLING AT LEAST ONE AREA

CROSS-REFERENCE TO RELATED APPLICATIONS

This application is a U.S. National Phase Application of International Patent Application No. PCT/EP2019/071132, filed Aug. 6, 2019, which claims the benefit of priority to European Patent Application No. 18187676.4, filed Aug. 7, 2018, the entire contents of which are hereby incorporated by reference herein.

FIELD OF THE INVENTION

The invention relates to a device for optically surveilling at least one area, a method for optically surveilling at least one area and various uses of the device. The device, methods and uses according to the present invention specifically may be employed for example for security technology, specifically, to restrict access to dangerous areas such as machines. However, other applications are also possible.

PRIOR ART

Light barriers and light curtains are known which can be used for restricting access to dangerous areas such as machines. A warning may be sent out when the area is entered, or the machine might even be shut down or sent to a control device, in particular a command may be sent to a machine or further evaluation device. Light barriers typically comprise an illumination device that points towards a receiver device. The receiver will be in a first state, such as a safe state, as long as a light beam sent from the illumination device is received. The receiver will be in a second state, such as a warning state, or shutdown state, if the light beam is not received. The light curtains can have several sender or receiver light beams in order to cover an area such as an entrance to a machine. The light curtain may use reflective elements such that sender and receiver can be placed next to each other or in order to use fewer sender or receiver units.

Light curtains are required by safety norms to be designed as such that they will recognize manipulations. For example, safety norm IEC 61496-2 requires that the light curtain cannot receive light that takes an indirect route from sender to receiver. For example, a redirection of the light beam using mirrors should be recognized by the light curtain. Further, an accidental redirection of the light beam due to shiny metal parts needs to be recognized by the light curtain.

Typical manipulations result from willful manipulations or not intentional manipulations. Willful manipulations may be made to make a machine more productive, if a safety unit such as a light curtain causes regular shut downs. Not intentional manipulations may be changes in the machine setup without noting that the safety unit is concerned.

Various approaches have been proposed to improve safety of light curtains. For example, small apertures in sender and receiver units may be used to make manipulations and changes less likely. However, this may result in that setting up the light curtain is more difficult, especially if infrared light is used in the illumination. In a further example, small apertures may be used in the receiver unit such that the receiver receives only light beams from the direction of the illumination device. To simplify the set-up phase of the sender and receiver unit relative to each other larger apertures and less collimate light beams may be used in the sender unit. However, this may reduce safety.

U.S. Pat. No. 7,667,185 B2 describes an optoelectronic sensor assembly with at least one light emitter and at least one light receiver comprising a spatially resolving receiving element, with the receiving element having an inner region comprising at least one photosensitive element for detecting the light beam and an outer region comprising at least one photosensitive element for determining the position of the light beam emitted by the light emitter, with the outer region satisfying lower sensitivity and/or bandwidth requirements than the inner region.

US 2008/173831 A1 describes an optoelectronic sensor for detecting objects in a monitored region which has light emitters and associated light receivers adjustably arranged relative to each other so that light emitted by the light emitter is directly received by the light receiver. The light emitter and the light receiver conform to normed requirements which define a normed region that is free of reflecting surfaces so that light emitted by the light emitter which passed beyond the normed region cannot be received by the light receiver due to a reflection of such light. In the normed region, an emitted light cone generated by the light emitter and a received light cone defined by the light receiver overlap within a normed opening angle. An evaluation unit interprets the interruption in the light directed to the light receiving element as a detection of an object in the monitored region. The light emitter forms an emitted light cone with an opening angle of any desired magnitude, while the light receiver has a received light cone with an opening angle of no more than one-half of the normed opening angle.

In a further example, the light curtain may be combined with a distance measurement such as a time-of-flight measurement. However, this will require a synchronized direct coupling of sender and receiver unit. DE 10 2016 122 364 A1 describes an optoelectronic sensor, in particular light curtain, for monitoring a surveillance area, wherein the sensor comprises at least one light transmitter for emitting a surveillance beam, at least one light receiver for receiving the surveillance beam and generating a corresponding received signal and an evaluation unit, in order to detect from the received signal if the surveillance beam is interrupted and to issue an interrupt signal upon detecting of an inadmissible interruption of the surveillance beam. In this case, the light receiver is configured such that the received signal depends from the geometry of the generated light spot of the surveillance beam on the light receiver, and the evaluation unit is configured to detect from the received signal whether the uninterrupted surveillance beam is manipulated. However, the bandwidth of such light receivers is often limited and modulation patterns other than 50:50 rectangular patterns may influence the performance of the device and may restrict the use for fast encoded modulations as commonly used in light curtains or light barriers. 50:50 rectangular modulation patterns are often not optimal for industry safety environments as further unrelated devices may emit these patterns and may therefore manipulate the light curtains.

Problem Addressed by the Invention

It is therefore an object of the present invention to provide devices and methods facing the above-mentioned technical challenges of known devices and methods. Specifically, it is an object of the present invention to provide devices and methods which improve safety such as preventing manipulations, preferably with a low technical effort and with low requirements in terms of technical resources and cost.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such a way with other optional or non-optional features of the invention.

In a first aspect of the present invention a device for optically surveilling at least one area is disclosed. The area may be a dangerous area and/or a surveillance area. As used herein, the ter "surveillance area" or "area for surveillance" refers to an arbitrary area of interest which is and/or needs to be monitored, for example due to safety reasons. Specifically, the device may be or may comprise at least one light barrier such at least one light curtain for surveilling at least one surveillance area. As used herein, the term "light barrier" has its ordinary meaning and specifically, refers to a device configured to determine one or more of a distance, absence, presence of an object by using a sender unit and receiver unit. The term light barrier also relates to determining presence or absence of the receiver unit, the sender unit or the reflective target. The light barrier may be a reflective or one-way device. For example, in a one-way device, the light barrier may comprise the receiver unit located within the line-of-sight of the sender unit. Thus, an object such as a human or part of a human may be detected when the light beam is prevented from getting to the receiver unit. For example, in a reflective light barrier the sender unit and the receiver unit may be arranged at the same location and the light barrier comprises in addition a reflective target to reflect the light beam generated by the sender unit back to the receiver unit. Thus, an object may be detected when the light beam does not reach the receiver unit. The light barrier may be using at least one light beam or a plurality of light beams such as an array of light beams of a light curtain. The light barrier may be designed as proximity sensor. Borders of the area of surveillance may be defined for one-way devices by a position of the sender unit and the receiver unit or for reflective devices by a position of the reflective target and the sender and receiver units. For example, the area may be a machine or an area of the machine such as a dangerous area of the machine. The area may be an access area, for example an access area to a machine. As used herein, the term "optically surveilling" refers to monitoring and/or observing and/or controlling the area using at least one light beam.

The device comprises a sender unit and a receiver unit. The sender unit has at least one illumination source. The illumination source is designed to generate at least one light beam having a beam profile. Each light beam is designated for propagating to the receiver unit, thereby traversing at least one area for surveillance. The receiver unit comprises

- at least one transfer device, wherein the transfer device has at least one focal length in response to the at least one incident light beam propagating from the illumination source to at least two optical sensors, wherein the transfer device has an optical axis, wherein the transfer device constitutes a coordinate system, wherein a longitudinal coordinate I is a coordinate along the optical axis and wherein d is a spatial offset from the optical axis,
- at least two optical sensors, wherein each optical sensor has at least one light sensitive area, wherein each optical sensor is designed to generate at least one sensor signal in response to an illumination of its respective light-sensitive area by the light beam, wherein two of the optical sensors are arranged in a manner that the light-sensitive areas of the two optical sensors differ in at least one of: their longitudinal coordinate, their spatial offset, or their surface areas; and
- at least one evaluation device, wherein the evaluation device is being configured for generating an output by monitoring at least one change of, firstly, the beam profile of the at least one light beam upon traversing the at least one area of surveillance by evaluating the sensor signals and, further, of at least one component of a location of the sender unit, wherein the component is determined with respect to the coordinate system of the transfer device, by evaluating a combined signal Q from the sensor signals.

As used herein, the term "sender unit" refers to at least one device configured for sending and/or transmitting at least one signal, specifically the at least one light beam. As used herein, the term "illumination source" refers to at least one device configured for generating at least one light beam. The illumination source may be or may comprise at least one light source. The light source may be or may comprise at least one multiple beam light source. For example, the light source may comprise at least LED or at least one laser source and at least one transfer device or one or more diffractive optical elements (DOEs). As used herein, the term "ray" generally refers to a line that is perpendicular to wavefronts of light which points in a direction of energy flow. As used herein, the term "beam" generally refers to a collection of rays. In the following, the terms "ray" and "beam" will be used as synonyms. As further used herein, the term "light beam" generally refers to an amount of light, specifically an amount of light traveling essentially in the same direction, including the possibility of the light beam having a spreading angle or widening angle. The light beam may have a spatial extension. Specifically, the light beam may have a non-Gaussian beam profile. The beam profile may be selected from the group consisting of a trapezoid beam profile; a triangle beam profile; a conical beam profile. The trapezoid beam profile may have a plateau region and at least one edge region. As used herein, the term "beam profile" generally refers to a transverse intensity profile of the light beam. The beam profile may be a spatial distribution, in particular in at least one plane perpendicular to the propagation of the light beam, of an intensity of the light beam. The light beam specifically may be a Gaussian light beam or a linear combination of Gaussian light beams, as will be outlined in further detail below. Other embodiments are feasible, however. The device for optically surveilling may comprise the at least one transfer device configured for one or more of adjusting, defining and determining the beam profile, in particular a shape of the beam profile.

As used herein, the term "light" generally refers to electromagnetic radiation in one or more of the visible spectral range, the ultraviolet spectral range and the infrared spectral range. Therein, the term visible spectral range generally refers to a spectral range of 380 nm to 780 nm. The term infrared spectral range generally refers to electromagnetic radiation in the range of 780 nm to 1 mm, preferably in the range of 780 nm to 3.0 micrometers. The term ultraviolet spectral range generally refers to electromagnetic radiation in the range of 1 nm to 380 nm, preferably in the range of 100 nm to 380 nm. Preferably, light as used within the present invention is visible light, i.e. light in the visible spectral range, or infrared light. The term "light beam" generally may refer to an amount of light emitted and/or reflected into a specific direction. Thus, the light beam may be a bundle of the light rays having a predetermined extension in a direction perpendicular to a direction of propagation of the light beam. Preferably, the light beams may be or may comprise one or more Gaussian light beams such as a linear combination of Gaussian light beams, which may be characterized by one or more Gaussian beam parameters, such as one or more of a beam waist, a Rayleigh-length or any other beam parameter or combination of beam parameters suited to characterize a development of a beam diameter and/or a beam propagation in space.

The device for optically surveilling may be configured such that the light beam propagates from the sender unit towards the receiver unit along an optical axis of the device for optically surveilling. For this purpose, the device for optically surveilling may comprise at least one reflective element or reflective target, preferably at least one prism, mirror, reflective foil, retro reflector or the like, for deflecting the illuminating light beam onto the optical axis. Specifically, the device for optically surveilling further may comprise at least one reflective target designed for being impinged by the at least one light beam propagating from the at least one illumination source to the at least two optical sensors. The sender unit may comprise at least one control device for controlling generating and/or sending the light beam. Alternatively, for reflective light barriers in which the sender unit and the receiver unit may be arranged such that light beam propagates from the sender unit towards a reflective target which reflects the light beam to the receiver unit. For this purpose, the device for optically surveilling may comprise at least one reflective target such as at least one reflective element or retroreflector.

The device for optically surveilling further may comprise a connection between the sender unit and the receiver unit, wherein the connection is designed for providing synchronization between the sender unit and the receiver unit. The synchronization between the sender unit and the receiver unit may be wire bound and/or may be implemented using at least one optical synchronization path. Preferably, the connection may be a wireless connection such that a wire bound connection is not necessary. The connection between sender and receiver unit may be used for transmitting monitoring signals to monitor a safe working mode of the illumination source or the sender unit.

Specifically, the illumination source may comprise at least one laser and/or laser source. Various types of lasers may be employed, such as semiconductor lasers. Additionally or alternatively, non-laser light sources may be used, such as LEDs and/or light bulbs. The illumination source may be adapted to generate and/or to project a cloud of points, for example the illumination source may comprise one or more of at least one digital light processing projector, at least one LCoS projector, at least one spatial light modulator; at least one diffractive optical element; at least one array of light emitting diodes; at least one array of laser light sources. The illumination source may comprise an artificial illumination source, in particular at least one laser source and/or at least one incandescent lamp and/or at least one semiconductor light source, for example, at least one light-emitting diode, in particular an organic and/or inorganic light-emitting diode. As an example, the light emitted by the illumination source may have a wavelength of 300 to 1000 nm, especially 500 to 1000 nm. Additionally or alternatively, light in the infrared spectral range may be used, such as in the range of 780 nm to 3.0 µm. Specifically, the light in the part of the near infrared region where silicon photodiodes are applicable specifically in the range of 700 nm to 1000 nm may be used. On account of their generally defined beam profiles and other properties of handleability, the use of at least one laser source as the illumination source is particularly preferred. The illumination source may be integrated into a housing of the device for optically surveilling.

The light beam traversing the surveillance area may be less collimated, e.g. the light beam may slightly expand with distance from the illumination source, which allows facilitating the setup of the light barrier.

The sender unit further may comprise at least one modulation source. As used herein, the term "modulation source" refers to at least one device configured for generating at least one modulation pattern. The modulation source may be configured for generating a modulation pattern in a manner that the modulation source impinges the illumination source to generate at least one light beam carrying the modulation pattern. The modulation pattern may be selected from the group consisting of: a pseudo random modulation pattern, an Aiken code, a BCD code, a Gillham code, a Stibitz code, a one-hot code, and a gray code. The modulation pattern may be selected from the group consisting of: a rectangular pulse pattern, 50:50 rectangular pattern, sinusoidal pattern, periodic pulse patterns. Compared to the optoelectronic sensor described in DE 10 2016 122 364 A1 the sender unit may use more complex modulation patterns to encode the light source. This may allow that the receiver unit detects the light beam which was send by the sender unit.

The sender unit may comprise at least two illumination sources. Each of the illumination sources may be designed for being modulated by an individual modulation pattern, the individual modulation pattern of two illumination sources being different with respect to each other. The sender unit may comprise an individual modulation source for each illumination source, or wherein the sender unit further comprises a multiplexer being designated for switching an individual impingement of at least two of the illumination sources by a single modulation source. The evaluation device is designated for assigning an individual modulation pattern to an individual illumination source.

The illumination source may have a geometrical extend from $1.5 \cdot 10^{-7}$ mm$^2$·sr to 314 mm$^2$·sr, preferable from $1 \cdot 10^{-5}$ mm$^2$·sr to 22 mm$^2$·sr, more preferable from 3.104 mm$^2$·sr to 3.3 mm$^2$·sr. The geometrical extent G of the illumination source may be defined by $G = A \cdot \Omega \cdot n^2$, specifically for rotationally-symmetric optical systems with a half aperture angle θ, $G = \pi \cdot A \cdot \sin^2(\theta) \cdot n^2$, wherein A is the area of the surface, which can be an active emitting surface, a light valve, optical aperture or the area of a fiber core (OF) with $A_{OF} = \pi \cdot r^2_{OF}$, and Ω is the projected solid angle subtended by the light and n is the refractive index of the medium. For optical fibers the divergence angle is obtained by $\theta_{max} = \arcsin(NA/n)$, where NA is the maximum numerical aperture of the optical fiber. For example, the illumination source may have an edge length of 10 mm and the projected solid angle may be 90°. For example, the illumination source may have an edge length of 3 mm and a projected solid angle of 60°. Other embodiments are feasible such as an edge length of 1 mm and a projected solid angle of 35°.

As used herein, the term "receiver unit" refers to at least one device configured for receiving the at least one light beam propagating from the sender unit to the receiver unit. For receiving the light beam, as outlined above, the receiver unit comprises at least two optical sensors. As used herein, an "optical sensor" generally refers to a light-sensitive device for detecting a light beam, such as for detecting an illumination and/or a light spot generated by at least one light beam. As further used herein, a "light-sensitive area" generally refers to an area of the respective optical sensor which may be illuminated externally, by the at least one light beam, in response to which illumination the at least one sensor signal is generated. The light-sensitive area may specifically be located on a surface of the respective optical sensor. Other embodiments, however, are feasible. As used herein, the term "at least two optical sensors each having at least one light sensitive area" refers to configurations with two single optical sensors each having one light sensitive area and to configurations with one combined optical sensor having at least two light sensitive areas. Thus, the term "optical sensor" furthermore refers to a light-sensitive device configured to generate one output signal, whereas, herein, a light-sensitive device configured to generate two or more output signals, for example at least one CCD and/or CMOS device, is referred to as two or more optical sensors. As will further be outlined in detail below, each optical sensor may be embodied such that precisely one light-sensitive area is present in the respective optical sensor, such as by providing precisely one light-sensitive area which may be illuminated, in response to which illumination precisely one uniform sensor signal is created for the whole optical sensor. Thus, each optical sensor may be a single area optical sensor. The use of the single area optical sensors, however, renders the setup of the receiver unit specifically simple and efficient. Thus, as an example, commercially available photo-sensors, such as commercially available silicon photodiodes, each having precisely one sensitive area, may be used in the set-up. Other embodiments, however, are feasible. Thus, as an example, an optical device comprising two, three, four or more than four light-sensitive areas may be used which is regarded as two, three, four or more than four optical sensors in the context of the present invention. As an example, the optical sensors may comprise a matrix of light-sensitive areas. Thus, as an example, the optical sensors may be part of or constitute a pixelated optical device. As an example, the optical sensors may be part of or constitute at least one CCD and/or CMOS device having a matrix of pixels, each pixel forming a light-sensitive area.

As further used herein, a "sensor signal" generally refers to a signal generated by an optical sensor in response to the illumination by the light beam. Specifically, the sensor signal may be or may comprise at least one electrical signal, such as at least one analogue electrical signal and/or at least one digital electrical signal. More specifically, the sensor signal may be or may comprise at least one voltage signal and/or at least one current signal. More specifically, the sensor signal may comprise at least one photocurrent. Further, either raw sensor signals may be used, or the receiver unit, the optical sensors or any other element may be adapted to process or preprocess the sensor signal, thereby generating secondary sensor signals, which may also be used as sensor signals, such as preprocessing by filtering or the like.

The light-sensitive areas may be oriented towards the sender unit, specifically for one-way light barriers. As used herein, the term "is oriented towards the sender unit" generally refers to the situation that the respective surfaces of the light-sensitive areas are fully or partially visible from the sender unit. Specifically, at least one interconnecting line between at least one point of the sender unit and at least one point of the respective light-sensitive area may form an angle with a surface element of the light-sensitive area which is different from 0°, such as an angle in the range of 20° to 90°, preferably 80 to 90° such as 90°. Thus, when the sender unit is located on the optical axis or close to the optical axis, the light beam propagating from the sender unit towards the receiver unit may be essentially parallel to the optical axis. As used herein, the term "essentially perpendicular" refers to the condition of a perpendicular orientation, with a tolerance of e.g. ±20° or less, preferably a tolerance of ±100 or less, more preferably a tolerance of ±5° or less. Similarly, the term "essentially parallel" refers to the condition of a parallel orientation, with a tolerance of e.g. ±20° or less, preferably a tolerance of ±10° or less, more preferably a tolerance of ±5° or less. Additionally or alternatively, at least one of the light-sensitive areas may be oriented differing from an orientation towards the sender unit and the receiver unit may comprise at least one reflective element and/or at least one optical fiber configured to guide the light beam onto the light-sensitive area.

The sender unit and the receiver unit may be arranged with respect to each other in a manner that the sensor signal of at least one of the optical sensors is a highest sensor signal. As used herein, the term "highest" refers to one or both of magnitude or intensity of the sensor signal. Specifically, the optimal arrangement of the light barrier's zero position may be as such that the sensitivity of the combined signal Q concerning changes in the sensor signal is highest.

The optical sensors may be sensitive in one or more of the ultraviolet, the visible or the infrared spectral range. Specifically, the optical sensors may be sensitive in the visible spectral range from 500 nm to 780 nm, most preferably at 650 nm to 750 nm or at 690 nm to 700 nm. Specifically, the optical sensors may be sensitive in the near infrared region.

Specifically, the optical sensors may be sensitive in the part of the near infrared region where silicon photodiodes are applicable specifically in the range of 700 nm to 1000 nm. The optical sensors, specifically, may be sensitive in the infrared spectral range, specifically in the range of 780 nm to 3.0 micrometers. For example, the optical sensors each, independently, may be or may comprise at least one element selected from the group consisting of a photodiode, a photocell, a photoconductor, a phototransistor or any combination thereof. For example, the optical sensors may be or may comprise at least one element selected from the group consisting of a CCD sensor element, a CMOS sensor element, a photodiode, a photocell, a photoconductor, a phototransistor or any combination thereof. Any other type of photosensitive element may be used. As will be outlined in further detail below, the photosensitive element generally may fully or partially be made of inorganic materials and/or may fully or partially be made of organic materials. Most commonly, as will be outlined in further detail below, one or more photodiodes may be used, such as commercially available photodiodes, e.g. inorganic semiconductor photodiodes. As further used herein, the term "photosensitive element" generally refers to an element which is sensitive against illumination in one or more of the ultraviolet, the visible or the infrared spectral range. Specifically, the photosensitive element may be or may comprise at least one element selected from the group consisting of a photodiode, a photocell, a photoconductor, a phototransistor or any combination thereof. Any other type of photosensitive element may be used.

The optical sensors specifically may be semiconductor sensors, preferably inorganic semiconductor sensors, more preferably photodiodes and most preferably silicon photodiodes. Thus, the present invention simply may be realized by using commercially available inorganic photodiodes, i.e. one small photodiode and one large area photodiode. Thus, the setup of the present invention may be realized in a cheap and inexpensive fashion. Specifically, the optical sensors may be or may comprise inorganic photodiodes which are sensitive in the infrared spectral range, preferably in the range of 780 nm to 3.0 micrometers, and/or sensitive in the visible spectral range, preferably in the range of 380 nm to 780 nm. Specifically, the optical sensors may be sensitive in the part of the near infrared region where silicon photodiodes are applicable specifically in the range of 700 nm to 1000 nm. Infrared optical sensors which may be used for the optical may be commercially available infrared optical sensors, such as infrared optical sensors commercially available under the brand name Hertzstueck™ from trinamiX GmbH, D-67056 Ludwigshafen am Rhein, Germany. Thus, as an example, the optical sensors may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, the optical sensors may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, the optical sensors may comprise at least one at least one photoconductive sensor such as a PbS or PbSe sensor, a bolometer, preferably a bolometer selected from the group consisting of a VO bolometer and an amorphous Si bolometer. The optical sensors may be opaque, transparent or semitransparent. For the sake of simplicity, however, opaque sensors which are not transparent for the light beam, may be used, since these opaque sensors generally are widely commercially available. The optical sensors specifically may be uniform sensor having a single light-sensitive area. Thus, the optical sensors specifically may be a non-pixelated optical sensor.

In view of the technical challenges involved in the prior art document DE 10 2016 122 364 A1 as discussed above, specifically in view of the technical effort which is required for generating the so called FiP effect as described in WO 2015/024871 it has to be noted that the present invention specifically may be realized by using non-FiP optical sensors. In fact, since optical sensors having the FiP characteristic typically exhibit a strong peak in the respective sensor signals at a focal point, the range of measurement of a receiver unit using FiP sensors as optical sensors may be limited to a range in between the two positions and which the first and second optical sensors are in focus of the light beam. When using linear optical sensors, however, i.e. optical sensors not exhibiting the FiP effect, this problem, with the setup of the present invention, generally may be avoided. Consequently, the first and second optical sensor may each have, at least within a range of measurement, a linear signal characteristic such that the respective first and second sensor signals may be dependent on the total power of illumination of the respective optical sensor and may be independent from a diameter of a light spot of the illumination. It shall be noted, however, that other embodiments are feasible, too.

The first and second optical sensors each specifically may be semiconductor sensors, preferably inorganic semiconductor sensors, more preferably photodiodes and most preferably silicon photodiodes. Thus, as opposed to complex and expensive FiP sensors, the present invention simply may be realized by using commercially available inorganic photodiodes, i.e. one small photodiode and one large area photodiode. Thus, the setup of the present invention may be realized in a cheap and inexpensive fashion. However, embodiments are feasible in which the receiver unit may comprise at least one FiP sensor adapted for generating the so called FiP effect as described in WO 2015/024871.

The illumination source and the optical sensors may be arranged in a common plane or in different planes. The illumination source and the optical sensors may have different spatial orientation. In particular, the illumination source and the optical sensors may be arranged in a twisted arrangement. The illuminating light beam generally may be parallel to the optical axis or tilted with respect to the optical axis, e.g. including an angle with the optical axis. As an example, the illuminating light beam, such as the laser light beam, and the optical axis may include an angle of less than 10°, preferably less than 5° or even less than 2°. Other embodiments, however, are feasible. Further, the illuminating light beam may be on the optical axis or off the optical axis. As an example, the illuminating light beam may be parallel to the optical axis having a distance of less than 10 mm to the optical axis, preferably less than 5 mm to the optical axis or even less than 1 mm to the optical axis or may even coincide with the optical axis.

The receiver unit comprises at least one transfer device. The term "transfer device", also denoted as "transfer system", may generally refer to one or more optical elements which are adapted to modify the light beam, such as by modifying one or more of a beam parameter of the light beam, a width of the light beam or a direction of the light beam. The transfer device may be adapted to guide the light beam onto the optical sensors. The transfer device specifically may comprise one or more of: at least one lens, for example at least one lens selected from the group consisting of at least one focus-tunable lens, at least one aspheric lens, at least one spheric lens, at least one Fresnel lens; at least one aspheric lens; at least one diffractive optical element; at least one concave mirror; at least one beam deflection element, preferably at least one mirror; at least one beam splitting element, preferably at least one of a beam splitting cube or a beam splitting mirror; at least one multi-lens system. The transfer device may comprise at least one gradient index (GRIN) lens such as GRIN lenses available from Grintech GmbH, Schillerstraße 1, 07745 Jena, Germany. The GRIN lens may have a continuous refraction gradient, for example, an axial and/or radial and/or spherical refraction gradient. The f-number of the GRIN lens may be dependent on a lens length. Using GRIN lens may allow miniaturizing optics, in particular using very thin optics. For example, very thin optics with a thickness or diameter of 0.2 mm may be possible. The transfer device may comprise at least one annular axial lens, for example torus form. The annular axial lens may have a plano-convex form, for example, an axial and/or radial and/or spherical curvature.

The transfer device has at least one focal length in response to the at least one incident light beam propagating from the illumination source to the at least two optical sensors. As used herein, the term "focal length" of the transfer device refers to a distance over which incident collimated rays which may impinge the transfer device are brought into a "focus" which may also be denoted as "focal point". Thus, the focal length constitutes a measure of an ability of the transfer device to converge an impinging light beam. Thus, the transfer device may comprise one or more imaging elements which can have the effect of a converging lens. By way of example, the transfer device can have one or more lenses, in particular one or more refractive lenses, and/or one or more convex mirrors. In this example, the focal length may be defined as a distance from the center of the thin refractive lens to the principal focal points of the thin lens. For a converging thin refractive lens, such as a convex or biconvex thin lens, the focal length may be considered as being positive and may provide the distance at which a beam of collimated light impinging the thin lens as the transfer device may be focused into a single spot. Additionally, the transfer device can comprise at least one wavelength-selective element, for example at least one optical filter. Additionally, the transfer device can be designed to impress a predefined beam profile on the electromagnetic radiation, for example, at the location of the sensor region and in particular the sensor area. The abovementioned optional embodiments of the transfer device can, in principle, be realized individually or in any desired combination.

The transfer device has an optical axis. In particular, the receiver unit and the transfer device have a common optical axis. As used herein, the term "optical axis of the transfer device" generally refers to an axis of mirror symmetry or rotational symmetry of the lens or lens system. The optical axis of the receiver unit may be a line of symmetry of the optical setup of the receiver unit. The transfer device, as an example, may comprise at least one beam path, with the elements of the transfer device in the beam path being located in a rotationally symmetrical fashion with respect to the optical axis. Still, one or more optical elements located within the beam path may also be off-centered or tilted with respect to the optical axis. In this case, however, the optical axis may be defined sequentially, such as by interconnecting the centers of the optical elements in the beam path, e.g. by interconnecting the centers of the lenses, wherein, in this context, the optical sensors are not counted as optical elements. The optical axis generally may denote the beam path. Therein, the receiver unit may have a single beam path along which a light beam may travel from the sender unit to the optical sensors, or may have a plurality of beam paths. As an example, a single beam path may be given or the beam path may be split into two or more partial beam paths. In the latter case, each partial beam path may have its own optical axis and the condition noted above generally may refer to each beam path independently. The optical sensors may be located in one and the same beam path or partial beam path. Alternatively, however, the optical sensors may also be located in different partial beam paths. In case the optical sensors are distributed over different partial beam paths, at least one first optical sensor is located in at least one first partial beam path, being offset from the optical axis of the first partial beam path by a first spatial offset, and at least one second optical sensor is located in at least one second partial beam path, being offset from the optical axis of the second partial beam path by at least one second spatial offset, wherein the first spatial offset and the second spatial offset are different.

The transfer device may constitute a coordinate system, wherein a longitudinal coordinate l is a coordinate along the optical axis and wherein d is a spatial offset from the optical axis. The coordinate system may be a polar coordinate system in which the optical axis of the transfer device forms a z-axis and in which a distance from the z-axis and a polar angle may be used as additional coordinates. A direction parallel or antiparallel to the z-axis may be considered a longitudinal direction, and a coordinate along the z-axis may be considered a longitudinal coordinate l. Any direction perpendicular to the z-axis may be considered a transversal direction, and the polar coordinate and/or the polar angle may be considered a transversal coordinate.

The optical sensors may be positioned off focus. As used herein, the term "focus" generally refers to one or both of a minimum extend of a circle of confusion of the light beam caused by the transfer device or a focal length of the transfer device. As used herein, the term "circle of confusion" refers to a light spot caused by a cone of light rays of the light beam focused by the transfer device. The circle of confusion may depend on a focal length f of the transfer device, a longitudinal distance from the sender unit to the transfer device, a diameter of an exit pupil of the transfer device, a longitudinal distance from the transfer device to the light sensitive area, a distance from the transfer device to an image of the sender unit. For example, for Gaussian beams, a diameter of the circle of confusion may be a width of the Gaussian beam. In particular, for a point like object situated or placed at infinite distance from the receiver unit the transfer device may be adapted to focus the light beam from the object into a focus point at the focal length of the transfer device. For non-point like objects situated or placed at infinite distance from the receiver unit the transfer device may be adapted to focus the light beam from at least one point of the object into a focus plane at the focal length of the transfer device. For point like objects not situated or placed at infinite distance from the receiver unit, the circle of confusion may have a minimum extend at least at one longitudinal coordinate. For non-point like objects not situated or placed at infinite distance from the receiver unit, the circle of confusion of the light beam from at least one point of the object may have a minimum extend at least at one longitudinal coordinate. As used herein, the term "positioned off focus" generally refers to a position other than the minimum extent of a circle of confusion of the light beam caused by the transfer device or a focal length of the transfer device. In particular, the focal point or minimum extend of the circle of confusion may be at a longitudinal coordinate $I_{focus}$, whereas the position of each of the optical sensors may have a longitudinal coordinate $I_{sensor}$ different from $I_{focus}$. For example, the longitudinal coordinate $I_{sensor}$ may be, in a longitudinal direction, arranged closer to the position of the transfer device than the longitudinal coordinate $I_{focus}$ or may be arranged further away from the position of the transfer device than the longitudinal coordinate $I_{focus}$. Thus, the longitudinal coordinate $I_{sensor}$ and the longitudinal coordinate $I_{focus}$ may be situated at different distances from the transfer device. For example, the optical sensors may be spaced apart from the minimum extend of the circle of confusion in longitudinal direction by ±2% of focal length, preferably by ±10% of focal length, most preferably ±20% of focal length. For example, at a focal length of the transfer device may be 20 mm and the longitudinal coordinate $I_{sensor}$ may be 19.5 mm, i.e. the sensors may be positioned at 97.5% focal length, such that $I_{sensor}$ is spaced apart from the focus by 2.5% of focal length.

The optical sensors are arranged such that the light-sensitive areas of the optical sensors differ in at least one of: their longitudinal coordinate, their spatial offset, or their surface areas. Each light-sensitive area may have a geometrical center. As used herein, the term "geometrical center" of an area generally may refer to a center of gravity of the area. As an example, if an arbitrary point inside or outside the area is chosen, and if an integral is formed over the vectors interconnecting this arbitrary point with each and every point of the area, the integral is a function of the position of the arbitrary point. When the arbitrary point is located in the geometrical center of the area, the integral of the absolute value of the integral is minimized. Thus, in other words, the geometrical center may be a point inside or outside the area with a minimum overall or sum distance from all points of the area.

For example, each geometrical center of each light-sensitive area may be arranged at a longitudinal coordinate $I_{center,i}$, wherein i denotes the number of the respective optical sensor. In the case of the receiver unit comprising precisely two optical sensors and in the case of the device for optically surveilling comprising more than two optical sensors, the optical sensors may comprise at least one first optical sensor, wherein the first optical sensor, in particular the geometrical center, being arranged at a first longitudinal coordinate $I_{center,1}$, and at least one second optical sensor, wherein the second optical sensor, in particular the geometrical center, being at a second longitudinal coordinate $I_{center,2}$, wherein the first longitudinal coordinate and the second longitudinal coordinate differ. For example, the first optical sensor and the second optical sensor may be located in different planes which are offset in a direction of the optical axis. The first optical sensor may be arranged in front of the second optical sensor. Thus, as an example, the first optical sensor may simply be placed on the surface of the second optical sensor. Additionally or alternatively, the first optical sensor may be spaced apart from the second optical sensor, for example, by no more than five times the square root of a surface area of the first light-sensitive area. Additionally or alternatively, the first optical sensor may be arranged in front of the second optical sensor and may be spaced apart from the second optical sensor by no more than 50 mm, preferably by no more than 15 mm. Relative distance of the first optical sensor and second optical sensor may depend, for example, on focal length or object distance.

The longitudinal coordinates of the optical sensors may also be identical, as long as one of the above-mentioned conditions is fulfilled. For example, the longitudinal coordinates of the optical sensors may be identical, but the light-sensitive areas may be spaced apart from the optical axis and/or the surface areas differ.

Each geometrical center of each light-sensitive area may be spaced apart from the optical axis of the transfer device, such as the optical axis of the beam path or the respective beam path in which the respective optical sensor is located. The distance, in particular in transversal direction, between the geometrical center and the optical axis is denoted by the term "spatial offset". In the case of precisely two optical sensors and in the case of more than two optical sensors, the optical sensors may comprise at least one first optical sensor being spaced apart from the optical axis by a first spatial offset and at least one second optical sensor being spaced apart from the optical axis by a second spatial offset, wherein the first spatial offset and the second spatial offset differ. The first and second spatial offsets, as an example, may differ by at least a factor of 1.2, more preferably by at least a factor of 1.5, more preferably by at least a factor of two. The spatial offsets may also be zero or may assume negative values, as long as one of the above-mentioned conditions is fulfilled.

As used herein, the term "surface area" generally refers to both of a shape and a content of at least one light-sensitive area. In the case of precisely two optical sensors and in the case of more than two optical sensors, the optical sensors may comprise at least one first optical sensor having a first surface area and at least one second optical sensor having a second surface area. In the case of the receiver unit comprising more than two optical sensors, e.g. a sensor element comprising a matrix of optical sensors, a first group of optical sensors or at least one of the optical sensors of the matrix may form a first surface area, wherein a second group of optical sensors or at least one other optical sensor of the matrix may form a second surface area. The first surface area and the second surface area may differ. In particular, the first surface area and the second surface area are not congruent. Thus, the surface area of the first optical sensor and the second optical sensor may differ in one or more of the shape or content. For example, the first surface area may be smaller than the second surface area. As an example, both the first surface area and the second surface area may have the shape of a square or of a rectangle, wherein side lengths of the square or rectangle of the first surface area are smaller than corresponding side lengths of the square or rectangle of the second surface area. Alternatively, as an example, both the first surface area and the second surface area may have the shape of a circle, wherein a diameter of the first surface area is smaller than a diameter of the second surface area. Again, alternatively, as an example, the first surface area may have a first equivalent diameter, and the second surface area may have a second equivalent diameter, wherein the first equivalent diameter is smaller than the second equivalent diameter. The surface areas may be congruent, as long as one of the above-mentioned conditions is fulfilled.

The optical sensors, in particular the light-sensitive areas, may overlap or may be arranged such that no overlap between the optical sensors is given.

As further used herein, the term "evaluation device" generally refers to an arbitrary device adapted to perform the named operations, preferably by using at least one data processing device and, more preferably, by using at least one processor and/or at least one application-specific integrated circuit. Thus, as an example, the at least one evaluation device may comprise at least one data processing device having a software code stored thereon comprising a number of computer commands. The evaluation device may provide one or more hardware elements for performing one or more of the named operations and/or may provide one or more processors with software running thereon for performing one or more of the named operations.

The evaluation device may be configured for generating the output based on the distance by photon ratio (DPR) technique which is described e.g. in WO 2018/091649 A1, WO 2018/091638 A1 and WO 2018/091640, the content of which is included by reference. The DPR technique allows distance measurements such as determining a longitudinal coordinate of the sender unit. In addition, the DPR technique also allows recognizing geometrical changes to the light beam upon traversing the area of surveillance such as partial coverage of the light beam.

The evaluation device is configured for generating an output by monitoring at least one change of, firstly, the beam profile of the at least one light beam upon traversing the at least one area of surveillance by evaluating the sensor signals and, further, of at least one component of a location of the sender unit, wherein the component is determined with respect to the coordinate system of the transfer device, by evaluating a combined signal Q from the sensor signals. As used herein, the term "combined signal Q" refers to a signal which is generated by combining the sensor signals, in particular by one or more of dividing the sensor signals, dividing multiples of the sensor signals or dividing linear combinations of the sensor signals. In particular, the combined signal may be a quotient signal. The combined signal Q may be determined by using various means. As an example, a software means for deriving the combined signal, a hardware means for deriving the combined signal, or both, may be used and may be implemented in the evaluation device. Thus, the evaluation device, as an example, may comprise at least one divider, wherein the divider is configured for deriving the quotient signal. The divider may fully or partially be embodied as one or both of a software divider or a hardware divider.

The combined signal Q can be used for determining manipulations such as willful and/or not intentional manipulations. The term "manipulation" refers to an arbitrary willful and/or not intentional intervention into the device for optically surveillance resulting in a change of one property of the light beam such as a change of a length and/or direction of the beam path. The beam path from the sender unit to the receiver unit may change due to changes in the optical system such as due to one or more of water, scratches, introducing additional reflective elements, dirt, or even falseful arrangement of the components of the light barrier. The light barrier may also determine presence or absence of the receiver unit, the sender unit or the reflective target. Specifically, such changes may lead to a change in one or more of x-, y-, or z-position of the sender unit, the beam profile, the combined signal Q and the sensor signals of the optical sensors. Changes of a length of the beam path may be detectable by monitoring the combined signal Q, specifically changes of the combined signal Q. The combined signal Q can be used for determining a z-position of the sender unit. As the combined signal Q depends on the beam profile of the light beam, the combined signal Q can be used for determining changes in the beam profile. The evaluation device may be configured to determine changes in the length of the beam path by determining and evaluating the combined signal Q as described e.g. in WO 2018/091649 A1, WO 2018/091638 A1 and WO 2018/091640 A1. The evaluation device may be configured for monitoring the combined signal Q and for determining changes of the combined signal Q. The evaluation device may be configured for determining a manipulation based the determined change. For example, the evaluation device may be adapted for determining the longitudinal coordinate of the sender unit by evaluating the combined signal Q. In case the z-position of the sender unit was changed, e.g. by introducing additional reflective elements, the evaluation of the combined signal Q will result in a longitudinal coordinate which is different from a reference longitudinal coordinate. The evaluation device may be configured for comparing the reference longitudinal coordinate and the measured longitudinal coordinate. The evaluation device may be configured for indicating a manipulation if the reference longitudinal coordinate and the measured longitudinal coordinate differ, wherein differences within a tolerance range may be tolerated. Manipulations further may result in a change of the x- and/or y-position of the light beam impinges on the respective optical sensor and, thus, to changes of coverage, such as a partial coverage, of the light sensitive area of the respective optical sensor. The combined signal Q can be used for detecting these geometrical changes of the light beam. Specifically, the evaluation device may be configured for determining a change of the at least one transversal coordinate x and/or y of the sender unit by detecting geometrical changes of the light beam, such as by monitoring simultaneously the position of the center of gravity of the light spot and the total intensity of the light spot, whereas a change in in at least one transversal coordinate x and/or y is likely in case the center of gravity position changes, while the total intensity of the light spot is unchanged. A combination of monitoring several parameters such as monitoring of the z-position in combination with monitoring the x- and/or y-position may allow enhancing reliability of the light barrier.

As used herein, the term "output" refers to an arbitrary indication about a change of a monitored parameter such as the beam profile of the light beam upon traversing the at least one area and/or of the at least one component of the location of the sender unit. The output may be and/or may comprise at least one output signal. The output may comprise at least one binary signal indicating whether or not a change is present. The output may comprise at least one information about the change such as an amount of difference, which parameter is changed, which parameter were monitored or the like.

The evaluation device may further be designed for generating the at least one output by monitoring a change of the sensor signals of the optical sensors. As used herein, the term "at least one component of the location of the sender unit" refers to one or more of x-position, y-position and z-position of the sender unit. Specifically the term "position of the sender unit" refers to position of at least one aperture of the sender unit. The evaluation device may be designed for generating the output by using at least one reference beam profile for the at least one light beam generated by the illumination source and at least one reference component for the at least one component of the location of the sender unit. As used herein, the term "change" refers to deviation such as from at least one reference beam profile and/or from at least one reference position of the sender unit and/or from reference sensor signals and/or from a reference combined signal. In addition, the term "change" refers to drop or even an absence such as from an interruption of the light beam. One or more reference parameter selected from the group consisting of the reference beam profile, the reference component of location, the reference sensor signals, the reference combined signal Q may be pre-determined and/or pre-defined. The at least one reference beam profile and/or the at least one reference component of the location of the sender unit and/or the reference sensor signals and/or the reference combined signal Q may be stored during a teaching phase. The evaluation device may comprise at least one storage unit in which one or more of the reference beam profile, the reference component of location, the reference sensor signals, the reference combined signal Q may be stored such as in a table or lookup table.

The evaluation device may be configured to compare the monitored parameter with the respective reference parameter. A change may be determined by using at least one mathematical operation such as subtracting the respective reference value or profile from the determined value or profile or vice versa, respectively. The evaluation device may be configured to determine if the difference between the reference parameter and the monitored parameter exceeds at least one threshold value and in case the difference exceeds the threshold to indicate a change. Manipulations may be defined as changes in one or more of x-, y-, or z-position, the combined signal Q and the sensor signals of the optical sensors, specifically, if the change concerns one optical sensor while the other sensor signal remains unchanged.

The combination of several surveillance parameters such as beam profile, combined signal Q, sensor signals, at least one component of location may allow providing a light barrier with enhanced reliability against manipulations. Specifically, the light barrier may be more reliable against reflections from highly reflective environment such as metal sheets or surfaces. Information from the beam profile or the x-y position may be used for safety monitoring functions. As an example, changes of the beam profile may also indicate dirt on the optical system that may cause a failure of the safety function. Further, exhaust gases, steam, or particle emissions that may cause a failure of the system may also be detected by monitoring the beam profile. Monitoring the z-positions such as the longitudinal coordinate of the sender unit may also allow recognizing a shortening of the distance the light is supposed to have traveled. This may indicate a change in the optical system such as due to water, scratches, manipulations, or dirt, or it may indicate a falseful reassembly of the light barrier.

The evaluation device may be configured for initiating at least one action based on the output, wherein the at least one action is selected from at least one of: providing at least one information such as a safety function, generating at least one warning, inducing at least one instruction, changing an output signal. The generating the warning may comprise generating and/or changing at least one electronic signal. Specifically, the evaluation device actuates at least one safety function based on the output. The information may be a warning, a safe-shutdown, an emergency warning, a violation information or the like. The evaluation device may be configured for assigning the information to a time of event and for storing a combination of the information with the time of event in an information log. The warning may comprise a visual, an audible or a haptic warning signal. The instruction may comprise initiating a shutdown of at least one apparatus, such as of a machine. The evaluation device may be configured that not every change in one of the monitored parameters may lead to a shutdown or warning, but may lead in each case to an information about the origin of the change such as the changed parameter.

The device for optically surveilling may comprise a plurality of sender units and/or receiver units. The receiver units may be configured to detect the light beams having traversed the area of surveillance of more than one sender unit simultaneously or non-simultaneously. To ensure safe operation, the receiver unit may be configured to monitor the presence of the light beam and/or the beam profile and/or at least one of x-position, y-position, z-position of each sender unit and send out an information in case of a change. In case of a plurality of receiver units the evaluation device may be configured to evaluate the sensor signals of each of the receiver units using for example a multiplexing scheme. Additionally or alternatively, each of the receiver units may comprise at least one evaluation device.

The evaluation device may comprise at least one safety unit comprising at least one electrosensitive protective equipment (ESPE). The ESPE may comprise a plurality of elements which are configured for protective tripping and/or presence sensing purposes such as a sensing function and/or a control or monitoring function. Specifically, the ESPE may comprise at least one output signal switching device (OSSD). The OSSD may be connected to a machine control system of an apparatus. In case the evaluation device has actuated the safety function, specifically has initiated the action as described above, the machine control system responds by going into a safe state such as an OFF state. The apparatus may comprise one or more of at least one electrically powered machine primary control element (MPCE) configured for controlling normal operation of the apparatus, at least one machine secondary control element (MSCE) which is a further machine control element configured for removing power source from prime mover of hazardous parts, at least one final switching device (FSD), at least one secondary switching device (SSD), normally closed (NC) contacts and normally open (NO) contacts. The FSD may be configured in response to the indication from the OSSD to interrupt the circuit connecting the machine control system to the machine primary control system. In this situation, the SSD may be configured for performing a back-up function by going to the OFF state and initiating further machine control actions such as de-energizing the MSCE.

The evaluation device may comprise at least one safe digital input channel and/or at least one safe digital output channel and/or at least one diagnostics channel, such as an IO-Link based diagnostics channel. The evaluation device may be connected to a further device such as a computer, laptop, console device, or mobile device for the teaching, parameter setup, setup, or for diagnostics, or the like. The evaluation device may comprise a memory for storing information such as diagnostics information to be transmitted immediately or at a later time to a further device, such as to one of the aforementioned further devices. The evaluation device may comprise an M12 connector for connecting to further devices or for connecting sender and receiver unit. The evaluation device may detect ambient incident light using the optical sensor or a further optical sensor. The ambient incident light level may be transmitted to a further device such as for diagnostics. The evaluation device may output errors and possible countermeasures related to the errors.

The sender and/or receiver unit may comprise at least one indicator illumination source, such as an indicator LED indicating a status of the sender and/or receiver unit or the type of an incident by changing a color of the illumination and/or by using different blinking or modulation patterns. As an example, different error levels may be indicated by a continuous or blinking red LED light, whereas the blinking may occur at frequencies of 1-10 Hz. Orange or green illumination may be used to indicate whether a stable amount of light is received by the receiver unit.

The evaluation device may be adapted to generate different signals or information depending on the area of surveillance such as by dividing the area of surveillance in at least two subareas, wherein the type of information that is generated is dependent on the subarea. For example, when the light beam is interrupted in a first subarea, a warning signal is generated, whereas when the light beam is interrupted in a second subarea, a shutdown signal is generated. This may allow to define different safety zones.

Using the DPR technique may be advantageous since it is possible to use commonplace and cheap Si-sensors such as bi-cells or quadrant diodes that are much faster and have a larger bandwidth than for example FiP sensors. Further Si-sensors may be more homogeneous and entirely intensity independent, whereas in FiP devices homogeneity requirements can make fabrication costly and intensity independence of the FiP quotient requires additional technical effort. For possible embodiments of sensors using DPR technique reference is made to WO 2018/091649 A1, WO 2018/091638 A1 and WO 2018/091640 A1, the content of which is included by reference. In the following the DPR technique for exemplary sensor setups is described, specifically the determination of the combined signal Q and determining the longitudinal coordinate z of the sender unit from the combined signal Q is described. The evaluation device may be configured for deriving the combined signal Q by one or more of dividing the sensor signals, dividing multiples of the sensor signals, dividing linear combinations of the sensor signals. The evaluation device may be configured for using at least one predetermined relationship between the combined signal Q and the longitudinal coordinate for determining the longitudinal coordinate. The determining of the at least one longitudinal coordinate of the sender unit may be performed by the at least one evaluation device. Thus, as an example, the relationship may be implemented in software and/or hardware, such as by implementing one or more lookup tables. Thus, as an example, the evaluation device may comprise one or more programmable devices such as one or more computers, application-specific integrated circuits (ASICs), Digital Signal Processors (DSPs), or Field Programmable Gate Arrays (FPGAs) which are configured to perform the above-mentioned evaluation, in order to determine the at least one longitudinal coordinate of the sender unit. Additionally or alternatively, however, the evaluation device may also fully or partially be embodied by hardware.

For example, the evaluation device is configured for deriving the combined signal Q by $$Q(z_O) = \frac{\int\int_{A_1} E(x, y; z_O)dxdy}{\int\int_{A_2} E(x, y; z_O)dxdy}$$

wherein x and y are transversal coordinates, A1 and A2 are areas of the beam profile of the light beam at the position of the optical sensors, and $E(x,y,z_o)$ denotes the beam profile for the distance of the sender unit $z_o$. Area A1 and area A2 may differ. In particular, A1 and A2 are not congruent. Thus, A1 and A2 may differ in one or more of the shape or content. The beam profile may be a cross section of the light beam. The beam profile may be selected from the group consisting of a trapezoid beam profile; a triangle beam profile; a conical beam profile and a linear combination of Gaussian beam profiles. Generally the beam profile is dependent on luminance $L(z_o)$ and beam shape $S(x,y;z_o)$, $E(x, y; zo)=L\cdot S$. Thus, by deriving the combined signal it may allow determining the longitudinal coordinate independent from luminance.

Each of the sensor signals may comprise at least one information of at least one area of the beam profile of the light beam. As used herein, the term "area of the beam profile" generally refers to an arbitrary region of the beam profile at the sensor position used for determining the combined signal Q. The light-sensitive areas may be arranged such that a first sensor signal comprises information of a first area of the beam profile and a second sensor signal comprises information of a second area of the beam profile. The first area of the beam profile and second area of the beam profile may be one or both of adjacent or overlapping regions. The first area of the beam profile and the second area of the beam profile may be not congruent in area.

The evaluation device may be configured to determine and/or to select the first area of the beam profile and the second area of the beam profile. The first area of the beam profile may comprise essentially edge information of the beam profile and the second area of the beam profile may comprise essentially center information of the beam profile. The beam profile may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. As used herein, the term "essentially center information" generally refers to a low proportion of edge information, i.e. proportion of the intensity distribution corresponding to edges, compared to a proportion of the center information, i.e. proportion of the intensity distribution corresponding to the center. Preferably the center information has a proportion of edge information of less than 10%, more preferably of less than 5%, most preferably the center information comprises no edge content. As used herein, the term "essentially edge information" generally refers to a low proportion of center information compared to a proportion of the edge information. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region. The first area of the beam profile may be area A2 and the second area of the beam profile may be area A1.

The edge information may comprise information relating to a number of photons in the first area of the beam profile and the center information may comprise information relating to a number of photons in the second area of the beam profile. The evaluation device may be adapted for determining an area integral of the beam profile. The evaluation device may be adapted to determine the edge information by integrating and/or summing of the first area. The evaluation device may be adapted to determine the center information by integrating and/or summing of the second area. For example, the beam profile may be a trapezoid beam profile and the evaluation device may be adapted to determine an integral of the trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Additionally or alternatively, the evaluation device may be adapted to determine one or both of center information or edge information from at least one slice or cut of the light spot. This may be realized, for example, by replacing the area integrals in the combined signal Q by line integrals along the slice or cut. For improved accuracy, several slices or cuts through the light spot may be used and averaged. In case of an elliptical spot profile, averaging over several slices or cuts may result in an improved distance information.

The evaluation device may be configured to derive the combined signal Q by one or more of dividing the edge information and the center information, dividing multiples of the edge information and the center information, dividing linear combinations of the edge information and the center information. Thus, essentially, photon ratios may be used as the physical basis of the method.

The two of the optical sensors may be designed and arranged as follows at least one first optical sensor having a first light-sensitive area, wherein the first optical sensor is configured to generate at least one first sensor signal in response to an illumination of the first light-sensitive area by the light beam propagating from the sender unit to the receiver unit; and at least one second optical sensor having a second light-sensitive area, wherein the second optical sensor is configured to generate at least one second sensor signal in response to an illumination of the second light-sensitive area by the light beam, wherein the first light-sensitive area is smaller than the second light-sensitive area.

The evaluation device may be configured for generating the output by evaluating the first and second sensor signals. The evaluation device may be further designed for generating the at least one output by monitoring a change of the first sensor signal or of the second sensor signal.

In this embodiment the optical sensors may be arranged such that the light-sensitive areas of the optical sensors differ in their longitudinal coordinate and/or their surface areas. The evaluation device is further designed for generating the at least one output by monitoring a change of the first sensor signal or of the second sensor signal. For one-way light barriers, the first and second light-sensitive areas specifically may be oriented towards the sender unit. Alternatively, for reflective light barriers, the sender unit and the first and the second light-sensitive areas may be oriented towards a reflective target.

The light beam propagating from the sender unit to the receiver unit specifically may fully illuminate the first light-sensitive area, such that the first light-sensitive area is fully located within the light beam, with a width of the light beam being larger than the light-sensitive area of the first optical sensor. Contrarily, preferably, the light beam propagating from the sender unit to the receiver unit specifically may create a light spot on the second light-sensitive area, which is smaller than the second light-sensitive area, such that the light spot is fully located within the second light-sensitive area. Within the light spot on the second light-sensitive area, a shadow created by the first optical sensor may be located. Thus, generally, the first optical sensor, having the smaller first light-sensitive area, may be located in front of the second optical sensor, as seen from the sender unit, with the first light-sensitive area being fully located within the light beam and with the light beam generating a light spot on the second light-sensitive area being smaller than the second light-sensitive area, and with further a shadow created by the first optical sensor within the light spot. The situation may easily be adjusted by a person skilled in the art of optics by choosing one or more appropriate lenses or elements having a focusing or defocusing effect on the light beam, such as by using an appropriate transfer device as will be outlined in further detail below. As further used herein, a light spot generally refers to a visible or detectable round or non-round illumination of an article, an area or object by a light beam.

As outlined above, the first light-sensitive area is smaller than the second light-sensitive area. As used therein, the term "is smaller than" refers to the fact that the surface area of the first light-sensitive area is smaller than the surface area of the second light-sensitive area, such as by at least a factor of 0.9, e.g. at least a factor of 0.7 or even by at least a factor of 0.5. As an example, both the first light-sensitive area and the second light-sensitive area may have the shape of a square or of a rectangle, wherein side lengths of the square or rectangle of the first light-sensitive area are smaller than corresponding side lengths of the square or rectangle of the second light-sensitive area. Alternatively, as an example, both the first light-sensitive area and the second light-sensitive area may have the shape of a circle, wherein a diameter of the first light-sensitive area is smaller than a diameter of the second light-sensitive area. Again, alternatively, as an example, the first light-sensitive area may have a first equivalent diameter, and the second light-sensitive area may have a second equivalent diameter, wherein the first equivalent diameter is smaller than the second equivalent diameter.

The first light-sensitive area specifically may overlap with the second light-sensitive area in a direction of propagation of the light beam. The light beam may illuminate both the first light-sensitive area and, fully or partially, the second light-sensitive area. Thus, as an example, as seen from a point located on an optical axis of the receiver unit, the first light-sensitive area may be located in front of the second light-sensitive area, such that the first light-sensitive area, as seen from the sender unit, is fully located within the second light-sensitive area. When the light beam propagates towards the first and second light-sensitive areas, as outlined above, the light beam may fully illuminate the first light-sensitive area and may create a light spot on the second light-sensitive area, wherein a shadow created by the first optical sensor is located within the light spot. It shall be noted, however, that other embodiments are feasible.

Specifically, the evaluation device may be configured to determine the at least one coordinate z of the sender unit by using at least one known, determinable or predetermined relationship between the combined signal derived from the first and second sensor signals and the longitudinal coordinate. Thus, the evaluation device specifically may be configured for deriving the combined signal Q by dividing the first and second sensor signals, by dividing multiples of the first and second sensor signals or by dividing linear combinations of the first and second sensor signals. As an example, Q may simply be determined as $Q=s1/s2$ or $Q=s2/s1$, with s1 denoting the first sensor signal and s2 denoting the second sensor signal. Additionally or alternatively, Q may be determined as $Q = a \cdot s1/b \cdot s2$ or $Q = b \cdot s2/a \cdot s1$, with a and b being real numbers which, as an example, may be predetermined or determinable. Additionally or alternatively, Q may be determined as $Q = (a \cdot s1 + b \cdot s2)/(c \cdot s1 + d \cdot s2)$, with a, b, c and d being real numbers which, as an example, may be predetermined or determinable. As a simple example for the latter, Q may be determined as $Q = s1/(s1+s2)$. Other combined signals are feasible.

Typically, in the setup described above, Q is a monotonous function of the longitudinal coordinate of the sender unit and/or of the size of the light spot such as the diameter or equivalent diameter of the light spot. Thus, as an example, specifically in case linear optical sensors are used, the quotient $Q = s1/s2$ is a monotonously decreasing function of the size of the light spot. Without wishing to be bound by this theory, it is believed that this is due to the fact that, in the preferred setup described above, both the first signal s1 and the second signal s2 decrease as a square function with increasing distance to the light source, since the amount of light reaching the receiver unit decreases. Therein, however, the first signal s1 decreases more rapidly than the second signal s2, since, in the optical setup as used in the experiments, the light spot in the image plane grows and, thus, is spread over a larger area. The quotient of the first and second sensor signals, thus, continuously decreases with increasing diameter of the light beam or diameter of the light spot on the first and second light-sensitive areas. The quotient, further, is mainly independent from the total power of the light beam, since the total power of the light beam forms a factor both in the first sensor signal and in the second sensor signal. Consequently, the combined signal Q may form a secondary signal which provides a unique and unambiguous relationship between the first and second sensor signals and the size or diameter of the light beam. Since, on the other hand, the size or diameter of the light beam is dependent on a distance between the sender unit, from which the light beam propagates towards the receiver unit, and the receiver unit itself, i.e. dependent on the longitudinal coordinate of the sender unit, a unique and unambiguous relationship between the first and second sensor signals and the longitudinal coordinate may exist. For the latter, reference e.g. may be made to WO 2014/097181 A1. The predetermined relationship may be determined by analytical considerations, such as by assuming a linear combination of Gaussian light beams, by empirical measurements, such as measurements measuring the first and second sensor signals or a secondary signal derived thereof as a function of the longitudinal coordinate of the sender unit, or both. The evaluation device may be configured for determining the longitudinal coordinate by evaluating the combined signal Q. The evaluation device may be configured for using at least one predetermined relationship between the combined signal Q and the longitudinal coordinate. The predetermined relationship may be one or more of an empiric relationship, a semi-empiric relationship and an analytically derived relationship. The evaluation device may comprise at least one data storage device for storing the predetermined relationship, such as a lookup list or a lookup table.

The first and second optical sensors specifically may be arranged linearly in one and the same beam path of the receiver unit. As used herein, the term "linearly" generally refers to that the sensors are arranged along one axis. Thus, as an example, the first and second optical sensors both may be located on an optical axis of the receiver unit. Specifically, the first and second optical sensors may be arranged concentrically with respect to an optical axis. The first optical sensor may be arranged in front of the second optical sensor. Thus, as an example, the first optical sensor may simply be placed on the surface of the second optical sensor. Additionally or alternatively, the first optical sensor may be spaced apart from the second optical sensor by no more than five times the square root of a surface area of the first light-sensitive area. Additionally or alternatively, the first optical sensor may be arranged in front of the second optical sensor and may be spaced apart from the second optical sensor by no more than 50 mm, preferably by no more than 15 mm.

As outlined above, the second light-sensitive area is larger than the first light-sensitive area. Thus, as an example, the second light-sensitive area may be larger by at least a factor of two, more preferably by at least a factor of three and most preferably by at least a factor of five and the first light-sensitive area. The first light-sensitive area specifically may be a small light-sensitive area, such that, preferably, the light beam fully illuminates this light-sensitive area. Thus, as an example which may be applicable to typical optical configurations, the first light-sensitive area may have a surface area of $0.01$ mm$^2$ to $150$ mm$^2$, more preferably a surface area of $0.1$ mm$^2$ to $100$ mm$^2$. The second light-sensitive area specifically may be a large area. Thus, preferably, within a measurement range of the receiver unit, light spots generated by a light beam propagating from the sender unit of the receiver may fully be located within the second light-sensitive area, such that the light spot is fully located within the borders of the second light-sensitive area. As an example, which is applicable e.g. in typical optical setups, the second light-sensitive area may have a surface area of $1$ mm$^2$ to $1000$ mm$^2$, more preferably a surface area of $2$ mm$^2$ to $600$ mm$^2$.

The first and second optical sensors each, independently, may be opaque, transparent or semitransparent. For the sake of simplicity, however, opaque sensors which are not transparent for the light beam, may be used, since these opaque sensors generally are widely commercially available.

The first and second optical sensors each specifically may be uniform sensors having a single light-sensitive area each. Thus, the first and second optical sensors specifically may be non-pixelated optical sensors.

As outlined above, by evaluating the first and second sensor signals, the evaluation device may be enabled to determine the at least one longitudinal coordinate of the sender unit. In addition, however, other coordinates of the sender unit, including one or more transversal coordinates and/or rotational coordinates, may be determined by the evaluation device. Thus, as an example, one or more additional transversal sensors may be used for determining at least one transversal coordinate. Various transversal sensors are generally known in the art, such as the transversal sensors disclosed in WO 2014/097181 A1 and/or other position-sensitive devices (PSDs), such as quadrant diodes, CCD or CMOS chips or the like. These devices may generally also be implemented into the receiver unit. As an example, a part of the light beam may be split off within the receiver unit, by at least one beam splitting element. The split-off portion, as an example, may be guided towards a transversal sensor, such as a CCD or CMOS chip or a camera sensor, and a transversal position of a light spot generated by the split-off portion on the transversal sensor may be determined, thereby determining at least one transversal coordinate.

Other embodiments of the first optical sensor and the second optical sensor, however, are feasible. For example, the first optical sensor and the second optical sensor may have light-sensitive areas having an identical size. In this case, for example, the first light-sensitive area and the second light sensitive area may be arranged such that the light-sensitive areas differ in their longitudinal coordinate.

In a further embodiment of the present invention, the receiver unit may comprise at least one sensor element having a matrix of optical sensors, the optical sensors each having a light-sensitive area. Each optical sensor may be configured to generate at least one sensor signal in response to an illumination of the light-sensitive area by the light beam propagating from the sender unit to the receiver unit. In this embodiment the optical sensors may be arranged such that the light-sensitive areas of the optical sensors differ in spatial offset and/or surface areas. The evaluation device may be configured for evaluating the sensor signals, by
- a) determining at least one optical sensor having the highest sensor signal and forming at least one center signal;
- b) evaluating the sensor signals of the optical sensors of the matrix and forming at least one sum signal;
- c) determining at least one combined signal by combining the center signal and the sum signal; and
- d) determining at least one longitudinal coordinate z of the sender unit by evaluating the combined signal.

As used herein, the term "sensor element" generally refers to a device or a combination of a plurality of devices configured for sensing at least one parameter. In the present case, the parameter specifically may be an optical parameter, and the sensor element specifically may be an optical sensor element. The sensor element may be formed as a unitary, single device or as a combination of several devices. As further used herein, the term "matrix" generally refers to an arrangement of a plurality of elements in a predetermined geometrical order. The matrix, as will be outlined in further detail below, specifically may be or may comprise a rectangular matrix having one or more rows and one or more columns. The rows and columns specifically may be arranged in a rectangular fashion. It shall be outlined, however, that other arrangements are feasible, such as nonrectangular arrangements. As an example, circular arrangements are also feasible, wherein the elements are arranged in concentric circles or ellipses about a center point. For example, the matrix may be a single row of pixels. Other arrangements are feasible.

The optical sensors of the matrix specifically may be equal in one or more of size, sensitivity and other optical, electrical and mechanical properties. The light-sensitive areas of all optical sensors of the matrix specifically may be located in a common plane, the common plane preferably facing the sender unit, such that the light beam propagating from the sender unit to the receiver unit may generate a light spot on the common plane.

As explained in more detail in one or more of the above-mentioned prior art documents, e.g. in WO 2012/110924 A1 or WO 2014/097181 A1, typically, a predetermined or determinable relationship exists between a size of a light spot, such as a diameter of the light spot, a beam waist or an equivalent diameter, and the longitudinal coordinate of the sender unit from which the light beam propagates towards the receiver unit. Without wishing to be bound by this theory, the light spot, may be characterized by two measurement variables: a measurement signal measured in a small measurement patch in the center or close to the center of the light spot, also referred to as the center signal, and an integral or sum signal integrated over the light spot, with or without the center signal. For a light beam having a certain total power which does not change when the beam is widened or focused, the sum signal should be independent from the spot size of the light spot, and, thus, should, at least when linear optical sensors within their respective measurement range are used, be independent from the distance between the sender unit and the receiver unit. The center signal, however, is dependent on the spot size. Thus, the center signal typically increases when the light beam is focused, and decreases when the light beam is defocused. By comparing the center signal and the sum signal, thus, an item of information on the size of the light spot generated by the light beam and, thus, on the longitudinal coordinate of the sender unit may be generated. The comparing of the center signal and the sum signal, as an example, may be done by forming the combined signal Q out of the center signal and the sum signal and by using a predetermined or determinable relationship between the longitudinal coordinate and the combined signal for deriving the longitudinal coordinate.

The use of a matrix of optical sensors provides a plurality of advantages and benefits. Thus, the center of the light spot generated by the light beam on the sensor element, such as on the common plane of the light-sensitive areas of the optical sensors of the matrix of the sensor element, may vary with a transversal position of the sender unit. By using a matrix of optical sensors, the receiver unit may adapt to these changes in conditions and, thus, may determine the center of the light spot simply by comparing the sensor signals. Consequently, the receiver unit may, by itself, choose the center signal and determine the sum signal and, from these two signals, derive a combined signal which contains information on the longitudinal coordinate of the sender unit. By evaluating the combined signal, the longitudinal coordinate of the sender unit may, thus, be determined. The use of the matrix of optical sensors, thus, provides a significant flexibility in terms of the position of the sender unit, specifically in terms of a transversal position of the sender unit.

The transversal position of the light spot on the matrix of optical sensors, such as the transversal position of the at least one optical sensor generating the sensor signal, may even be used as an additional item of information, from which at least one item of information on a transversal position of the sender unit may be derived, as e.g. disclosed in WO 2014/198629 A1. Additionally or alternatively, the receiver unit may comprise at least one additional transversal detector for, in addition to the at least one longitudinal coordinate, detecting at least one transversal coordinate of the sender unit.

Consequently, in accordance with the present invention, the term "center signal" generally refers to the at least one sensor signal comprising essentially center information of the beam profile. As used herein, the term "highest sensor signal" refers to one or both of a local maximum or a maximum in a region of interest. For example, the center signal may be the signal of the at least one optical sensor having the highest sensor signal out of the plurality of sensor signals generated by the optical sensors of the entire matrix or of a region of interest within the matrix, wherein the region of interest may be predetermined or determinable within an image generated by the optical sensors of the matrix. The center signal may arise from a single optical sensor or, as will be outlined in further detail below, from a group of optical sensors, wherein, in the latter case, as an example, the sensor signals of the group of optical sensors may be added up, integrated or averaged, in order to determine the center signal. The group of optical sensors from which the center signal arises may be a group of neighboring optical sensors, such as optical sensors having less than a predetermined distance from the actual optical sensor having the highest sensor signal, or may be a group of optical sensors generating sensor signals being within a predetermined range from the highest sensor signal. The group of optical sensors from which the center signal arises may be chosen as large as possible in order to allow maximum dynamic range. The evaluation device may be adapted to determine the center signal by integration of the plurality of sensor signals, for example the plurality of optical sensors around the optical sensor having the highest sensor signal. For example, the beam profile may be a trapezoid beam profile and the evaluation device may be adapted to determine an integral of the trapezoid, in particular of a plateau of the trapezoid.

Similarly, the term "sum signal" generally refers to a signal comprising essentially edge information of the beam profile. For example, the sum signal may be derived by adding up the sensor signals, integrating over the sensor signals or averaging over the sensor signals of the entire matrix or of a region of interest within the matrix, wherein the region of interest may be predetermined or determinable within an image generated by the optical sensors of the matrix. When adding up, integrating over or averaging over the sensor signals, the actual optical sensors from which the sensor signal is generated may be left out of the adding, integration or averaging or, alternatively, may be included into the adding, integration or averaging. The evaluation device may be adapted to determine the sum signal by integrating signals of the entire matrix, or of the region of interest within the matrix. For example, the beam profile may be a trapezoid beam profile and the evaluation device may be adapted to determine an integral of the entire trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Additionally or alternatively, the evaluation device may be adapted to determine one or both of center information or edge information from at least one slice or cut of the light spot. This may be realized for example by replacing the area integrals in the combined signal Q by line integrals along the slice or cut. For improved accuracy, several slices or cuts through the light spot may be used and averaged. In case of an elliptical spot profile, averaging over several slices or cuts may result in an improved distance information.

Similarly, the term "combined signal", as used herein, generally refers to a signal which is generated by combining the center signal and the sum signal. Specifically, the combination may include one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa. Additionally or alternatively, the combined signal may comprise an arbitrary signal or signal combination which contains at least one item of information on a comparison between the center signal and the sum signal.

The light beam specifically may fully illuminate the at least one optical sensor from which the center signal is generated, such that the at least one optical sensor from which the center signal arises is fully located within the light beam, with a width of the light beam being larger than the light-sensitive area of the at least one optical sensor from which the sensor signal arises. Contrarily, preferably, the light beam specifically may create a light spot on the entire matrix which is smaller than the matrix, such that the light spot is fully located within the matrix. This situation may easily be adjusted by a person skilled in the art of optics by choosing one or more appropriate lenses or elements having a focusing or defocusing effect on the light beam, such as by using an appropriate transfer device.

As outlined above, the center signal generally may be a single sensor signal, such as a sensor signal from the optical sensor in the center of the light spot, or may be a combination of a plurality of sensor signals, such as a combination of sensor signals arising from optical sensors in the center of the light spot, or a secondary sensor signal derived by processing a sensor signal derived by one or more of the aforementioned possibilities. The determination of the center signal may be performed electronically, since a comparison of sensor signals is fairly simply implemented by conventional electronics, or may be performed fully or partially by software. Specifically, the center signal may be selected from the group consisting of: the highest sensor signal; an average of a group of sensor signals being within a predetermined range of tolerance from the highest sensor signal; an average of sensor signals from a group of optical sensors containing the optical sensor having the highest sensor signal and a predetermined group of neighboring optical sensors; a sum of sensor signals from a group of optical sensors containing the optical sensor having the highest sensor signal and a predetermined group of neighboring optical sensors; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors containing the optical sensor having the highest sensor signal and a predetermined group of neighboring optical sensors; an integral of a group of sensor signals being within a predetermined range of tolerance from the highest sensor signal; an integral of a group of sensor signals being above a predetermined threshold.

As outlined above, raw sensor signals of the optical sensors may be used for evaluation or secondary sensor signals derived thereof. As used herein, the term "secondary sensor signal" generally refers to a signal, such as an electronic signal, more preferably an analogue and/or a digital signal, which is obtained by processing one or more raw signals, such as by filtering, averaging, demodulating or the like. Thus, image processing algorithms may be used for generating secondary sensor signals from the totality of sensor signals of the matrix or from a region of interest within the matrix. Specifically, the evaluation device may be configured for transforming the sensor signals of the optical sensor, thereby generating secondary optical sensor signals, wherein the evaluation device is configured for performing steps a)-d) by using the secondary optical sensor signals. The transformation of the sensor signals specifically may comprise at least one transformation selected from the group consisting of: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or maybe determined automatically, such as by recognizing an object within an image generated by the optical sensors. As an example, a vehicle, a person or another type of predetermined object may be determined by automatic image recognition within an image, i.e. within the totality of sensor signals generated by the optical sensors, and the region of interest may be chosen such that the object is located within the region of interest. In this case, the evaluation, such as the determination of the longitudinal coordinate, may be performed for the region of interest, only. Other implementations, however, are feasible.

As outlined above, the detection of the center of the light spot, i.e. the detection of the center signal and/or of the at least one optical sensor from which the center signal arises, may be performed fully or partially electronically or fully or partially by using one or more software algorithms. Specifically, the evaluation device may comprise at least one center detector for detecting the at least one highest sensor signal and/or for forming the center signal. The center detector specifically may fully or partially be embodied in software and/or may fully or partially be embodied in hardware. The center detector may fully or partially be integrated into the at least one sensor element and/or may fully or partially be embodied independently from the sensor element.

As outlined above, the sum signal may be derived from all sensor signals of the matrix, from the sensor signals within a region of interest or from one of these possibilities with the sensor signals arising from the optical sensors contributing to the center signal excluded. In every case, a reliable sum signal may be generated which may be compared with the center signal reliably, in order to determine the longitudinal coordinate. Generally, the sum signal may be selected from the group consisting of: an average over all sensor signals of the matrix; a sum of all sensor signals of the matrix; an integral of all sensor signals of the matrix; an average over all sensor signals of the matrix except for sensor signals from those optical sensors contributing to the center signal; a sum of all sensor signals of the matrix except for sensor signals from those optical sensors contributing to the center signal; an integral of all sensor signals of the matrix except for sensor signals from those optical sensors contributing to the center signal; a sum of sensor signals of optical sensors within a predetermined range from the optical sensor having the highest sensor signal; an integral of sensor signals of optical sensors within a predetermined range from the optical sensor having the highest sensor signal; a sum of sensor signals above a certain threshold of optical sensors being located within a predetermined range from the optical sensor having the highest sensor signal; an integral of sensor signals above a certain threshold of optical sensors being located within a predetermined range from the optical sensor having the highest sensor signal. Other options, however, exist.

The summing may be performed fully or partially in software and/or may be performed fully or partially in hardware. A summing is generally possible by purely electronic means which, typically, may easily be implemented into the receiver unit. Thus, in the art of electronics, summing devices are generally known for summing two or more electrical signals, both analogue signals and digital signals. Thus, the evaluation device may comprise at least one summing device for forming the sum signal. The summing device may fully or partially be integrated into the sensor element or may fully or partially be embodied independently from the sensor element. The summing device may fully or partially be embodied in one or both of hardware or software.

As outlined above, the comparison between the center signal and the sum signal specifically may be performed by forming one or more quotient signals. Thus, generally, the combined signal may be a quotient signal, derived by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa; forming a quotient of the center signal and a linear combination of the sum signal and the center signal or vice versa; forming a quotient of the sum signal and a linear combination of the sum signal and the center signal or vice versa; forming a quotient of an exponentiation of the center signal and an exponentiation of the sum signal or vice versa. Other options, however, exist. The evaluation device may be configured for forming the one or more quotient signals. The evaluation device may further be configured for determining the at least one longitudinal coordinate by evaluating the at least one quotient signal.

The evaluation device specifically may be configured for using at least one predetermined relationship between the combined signal Q and the longitudinal coordinate, in order to determine the at least one longitudinal coordinate. Thus, due to the reasons disclosed above and due to the dependency of the properties of the light spot on the longitudinal coordinate, the combined signal Q typically is a monotonous function of the longitudinal coordinate and/or of the size of the light spot such as the diameter or equivalent diameter of the light spot. Thus, as an example, specifically in case linear optical sensors are used, a simple quotient of the sensor signal $s_{center}$ and the sum signal $s_{sum}$ $Q=s_{center}/s_{sum}$ may be a monotonously decreasing function of the distance. Without wishing to be bound by this theory, it is believed that this is due to the fact that, in the preferred setup described above, both the center signal $s_{center}$ and the sum signal $s_{sum}$ decrease as a square function with increasing distance to the light source, since the amount of light reaching the receiver unit decreases. Therein, however, the center signal $s_{center}$ decreases more rapidly than the sum signal $s_{sum}$, since, in the optical setup as used in the experiments, the light spot in the image plane grows and, thus, is spread over a larger area. The quotient of the center signal and the sum signal, thus, continuously decreases with increasing diameter of the light beam or diameter of the light spot on the light-sensitive areas of the optical sensors of the matrix. The quotient, further, is typically independent from the total power of the light beam, since the total power of the light beam forms a factor both in the center signal and in the sum sensor signal. Consequently, the quotient Q may form a secondary signal which provides a unique and unambiguous relationship between the center signal and the sum signal and the size or diameter of the light beam. Since, on the other hand, the size or diameter of the light beam is dependent on a distance between the sender unit, from which the light beam propagates towards the receiver unit, and the receiver unit itself, i.e. dependent on the longitudinal coordinate of the sender unit, a unique and unambiguous relationship between the center signal and the sum signal on the one hand and the longitudinal coordinate on the other hand may exist. For the latter, reference e.g. may be made to one or more of the above-mentioned prior art documents, such as WO 2014/097181 A1. The predetermined relationship may be determined by analytical considerations, such as by assuming a linear combination of Gaussian light beams, by empirical measurements, such as measurements measuring the combined signal and/or the center signal and the sum signal or secondary signals derived thereof as a function of the longitudinal coordinate of the sender unit, or both.

Thus, generally, the evaluation device may be configured for determining the longitudinal coordinate by evaluating the combined signal Q such as the quotient signal. This determining may be a one-step process, such as by directly combining the center signal and the sum signal and deriving the longitudinal coordinate thereof, or may be a multiple step process, such as by firstly deriving the combined signal from the center signal and the sum signal and, secondly, by deriving the longitudinal coordinate from the combined signal. Both options, i.e. the option of steps c) and d) being separate and independent steps and the option of steps c) and d) being fully or partially combined, shall be comprised by the present invention.

The evaluation device may be configured for using at least one predetermined relationship between the combined signal and the longitudinal coordinate. The predetermined relationship may be one or more of an empiric relationship, a semi-empiric relationship and an analytically derived relationship. The evaluation device may comprise at least one data storage device for storing the predetermined relationship, such as a lookup list or a lookup table.

As outlined above, the optical sensors specifically may be or may comprise photodetectors, preferably inorganic photodetectors, more preferably inorganic semiconductor photodetectors, most preferably silicon photodetectors. Specifically, the optical sensors may be sensitive in the infrared spectral range. All of the optical sensors of the matrix or at least a group of the optical sensors of the matrix specifically may be identical. Groups of identical optical sensors of the matrix specifically may be provided for different spectral ranges, or all optical sensors may be identical in terms of spectral sensitivity. Further, the optical sensors may be identical in size and/or with regard to their electronic or optoelectronic properties.

The matrix may be composed of independent optical sensors. Thus, a matrix of inorganic photodiodes may be composed. Alternatively, however, a commercially available matrix may be used, such as one or more of a CCD detector, such as a CCD detector chip, and/or a CMOS detector, such as a CMOS detector chip.

Thus, generally, the optical sensors may form a sensor array or may be part of a sensor array, such as the above-mentioned matrix. Thus, as an example, the receiver unit may comprise an array of optical sensors, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that $0.3 \leq m/n \leq 3$, such as by choosing m/n=1:1, 4:3, 16:9 or similar. As an example, the array may be a square array, having an equal number of rows and columns, such as by choosing m=2, n=2 or m=3, n=3 or the like.

As further outlined above, the matrix specifically may be a rectangular matrix having at least one row, preferably a plurality of rows, and a plurality of columns. As an example, the rows and columns may be oriented essentially perpendicular, wherein, with respect to the term "essentially perpendicular", reference may be made to the definition given above. Thus, as an example, tolerances of less than 20°, specifically less than 100 or even less than 5°, may be acceptable. In order to provide a wide range of view, the matrix specifically may have at least 10 rows, preferably at least 500 rows, more preferably at least 1000 rows. Similarly, the matrix may have at least 5 columns, preferably at least 500 columns, more preferably at least 1000 columns. The matrix may comprise at least 50 optical sensors, preferably at least 10000 optical sensors, more preferably at least 500000 optical sensors. The matrix may comprise a number of pixels in a multi-mega pixel range. Other embodiments, however, are feasible. Thus, as outlined above, in setups in which an axial rotational symmetry is to be expected, circular arrangements or concentric arrangements of the optical sensors of the matrix, which may also be referred to as pixels, may be preferred.

As further outlined above, preferably, the sensor element may be oriented essentially perpendicular to the optical axis of the receiver unit. With respect to the term "essentially perpendicular", reference may be made to the definition and the tolerances given above. The optical axis may be a straight optical axis or may be bent or even split, such as by using one or more deflection elements and/or by using one or more beam splitters, wherein the essentially perpendicular orientation, in the latter cases, may refer to the local optical axis in the respective branch or beam path of the optical setup.

As outlined above, by evaluating the center signal and the sum signal, the receiver unit may be enabled to determine the at least one longitudinal coordinate of the sender unit including one or more transversal coordinates and/or rotational coordinates, may be determined by the evaluation device. Thus, as an example, one or more transversal sensors may be used for determining at least one transversal coordinate. As outlined above, the position of the at least one optical sensor from which the center signal arises may provide information on the at least one transversal coordinate of the sender unit, wherein, as an example, a simple lens equation may be used for optical transformation and for deriving the transversal coordinate. Additionally or alternatively, one or more additional transversal sensors may be used and may be comprised by the receiver unit. Various transversal sensors are generally known in the art, such as the transversal sensors disclosed in WO 2014/097181 A1 and/or other position-sensitive devices (PSDs), such as quadrant diodes, CCD or CMOS chips or the like. Additionally or alternatively, as an example, the receiver unit may comprise one or more PSDs disclosed in R. A. Street: *Technology and Applications of Amorphous Silicon*, Springer-Verlag Heidelberg, 2010, pp. 346-349. Other embodiments are feasible. These devices may generally also be implemented into the receiver unit. As an example, a part of the light beam may be split off within the receiver unit, by at least one beam splitting element. The split-off portion, as an example, may be guided towards a transversal sensor, such as a CCD or CMOS chip or a camera sensor, and a transversal position of a light spot generated by the split-off portion on the transversal sensor may be determined, thereby determining at least one transversal coordinate. The evaluation device may be adapted to combine the information of the longitudinal coordinate and the transversal coordinate and to determine a position of the sender unit in space.

The receiver unit may be configured for evaluating a single light beam or a plurality of light beams. In case a plurality of light beams propagates from the sender unit to the receiver unit, means for distinguishing the light beams may be provided. Thus, the light beams may have different spectral properties, and the receiver unit may comprise one or more wavelength selective elements for distinguishing the different light beams. Each of the light beams may then be evaluated independently. The wavelength selective elements, as an example, may be or may comprise one or more filters, one or more prisms, one or more gratings, one or more dichroitic mirrors or arbitrary combinations thereof. Further, additionally or alternatively, for distinguishing two or more light beams, the light beams may be modulated in a specific fashion. Thus, as an example, the light beams may be frequency modulated, and the sensor signals may be demodulated in order to distinguish partially the sensor signals originating from the different light beams, in accordance with their demodulation frequencies. These techniques generally are known to the skilled person in the field of high-frequency electronics. Generally, the evaluation device may be configured for distinguishing different light beams having different modulations.

The illumination source may be adapted to generate and/or to project a cloud of points such that a plurality of illuminated regions is generated on the matrix of optical sensor, for example the CMOS detector. Additionally, disturbances may be present on the matrix of optical sensor such as disturbances due to speckles and/or extraneous light and/or multiple reflections. The evaluation device may be adapted to determine at least one region of interest, for example one or more pixels illuminated by the light beam which are used for determination of the longitudinal coordinate. For example, the evaluation device may be adapted to perform a filtering method, for example, a blob-analysis and/or object recognition method.

In an embodiment, the two optical sensors may be arranged such that the geometrical centers of the optical sensors are spaced apart from an optical axis of the transfer device by different spatial offsets. The evaluation device may be configured for determining at least one longitudinal coordinate z by combining the at least two sensor signals. In this embodiment the optical sensors may be arranged such that the light-sensitive areas of the optical sensors differ in their spatial offset and/or their surface areas. The light-sensitive areas of the optical sensors may overlap, as visible from the sender unit, or may not overlap, i.e. may be placed next to each other without overlap. The light-sensitive areas may be spaced apart from each other or may directly be adjacent.

The receiver unit may comprise more than two optical sensors. In any case, i.e. in the case of the receiver unit comprises precisely two optical sensors and in the case of the receiver unit comprises more than two optical sensors, the optical sensors may comprise at least one first optical sensor being spaced apart from the optical axis by a first spatial offset and at least one second optical sensor being spaced apart from the optical axis by a second spatial offset, wherein the first spatial offset and the second spatial offset differ. In case further optical sensors are provided, besides the first and second optical sensors, these additional optical sensors may also fulfill the condition or, alternatively, may be spaced apart from the optical axis by the first spatial offset, by the second spatial offset or by a different spatial offset. The first and second spatial offsets, as an example, may differ by at least a factor of 1.2, more preferably by at least a factor of 1.5, more preferably by at least a factor of two. The spatial offsets may also be zero or may assume negative values, as long as the above-mentioned conditions are fulfilled.

For example, the optical sensors may be partial diodes of a segmented diode, with a center of the segmented diode being off-centered from the optical axis of the transfer device. The optical sensors may be partial diodes of a bi-cell or quadrant diode and/or comprise at least one CMOS sensor. As used herein, the term "partial diode" may comprise several diodes that are connected in series or in parallel. This example is rather simple and cost-efficiently realizable. Thus, as an example, bi-cell diodes or quadrant diodes are widely commercially available at low cost, and driving schemes for these bi-cell diodes or quadrant diodes are generally known. As used herein, the term "bi-cell diode" generally refers to a diode having two partial diodes in one packaging. Bi-cell and quadrant diodes may have two or four separate light sensitive areas, in particular two or four active areas. As an example, the bi-cell diodes may each form independent diodes having the full functionality of a diode. As an example, each of the bi-cell diodes may have a square or rectangular shape, and the two diodes may be placed in one plane such that the two partial diodes, in total, form a 1×2 or 2×1 matrix having a rectangular shape. In the present invention, however, a new scheme for evaluating the sensor signals of the bi-cell diodes and quadrant diode is proposed, as will be outlined in further detail below. Generally, however, the optical sensors specifically may be partial diodes of a quadrant diode, with a center of the quadrant diode being off-centered from the optical axis of the transfer device. As used herein, the term "quadrant diode" generally refers to a diode having four partial diodes in one packaging. As an example, the four partial diodes may each form independent diodes having the full functionality of a diode. As an example, the four partial diodes may each have a square or rectangular shape, and the four partial diodes may be placed in one plane such that the four partial diodes, in total, form a 2×2 matrix having a rectangular or square shape. In a further example, the four partial diodes, in total, may form a 2×2 matrix having a circular or elliptical shape. The partial diodes, as an example, may be adjacent, with a minimum separation from one another. As an example, the center of the bi-cell diodes, which may be an intersection of the geometrical centers of the optical sensors of the bi-cell diode, may be off-centered from the optical axis by at least 0.01 mm, more preferably by at least 0.1 mm, more preferably by at least 1.0 mm or even 2.0 mm. Thus, as a further example, the center of the center of the bi-cell diodes may be off-centered from the optical axis by a factor of at least 0.0001 times the maximum extent of the light sensitive area orthogonal to the optical axis, preferably by a factor of at least 0.001, more preferably by a factor of at least 0.005 times the maximum extent of the light sensitive area orthogonal to the optical axis.

In case a quadrant diode is used, having a 2×2 matrix of partial diodes, the center of the quadrant diode specifically may be off-centered or offset from the optical axis of the transfer device of the receiver unit. Thus, as an example, the center of the quadrant diodes, which may be an intersection of the geometrical centers of the optical sensors of the quadrant diode, may be off-centered from the optical axis by at least 0.01 mm, more preferably by at least 0.1 mm, more preferably by at least 1.0 mm or even 2.0 mm. Thus, as a further example, the center of the center of the quadrant diodes may be off-centered from the optical axis by a factor of at least 0.0001 times the maximum extent of the light sensitive area orthogonal to the optical axis, preferably by a factor of at least 0.001, more preferably by a factor of at least 0.005 times the maximum extent of the light sensitive area orthogonal to the optical axis. Similarly, when using other types of optical sensors setups having a plurality of optical sensors, an overall center of the optical sensors may be offset from the optical axis by the same distance.

Generally, the light-sensitive areas of the optical sensors may have an arbitrary surface area or size. Preferably, however, specifically in view of a simplified evaluation of the sensor signals, the light-sensitive areas of the optical sensors are substantially equal, such as within a tolerance of less than 10%, preferably less than 5% or even less than 1%. This, specifically, is the case in typical commercially available quadrant diodes.

Specifically, the evaluation device may be configured to determine the at least one longitudinal coordinate z of the sender unit using at least one known, determinable or predetermined relationship between sensor signals and/or any secondary signal derived thereof and the longitudinal coordinate. Thus, the evaluation device may be configured for determining at least one combined sensor signal out of the at least two sensor signals, i.e. of the at least one sensor signal of at least one first optical sensor and out of the at least one sensor signal of at least one second optical sensor. As generally used herein, the term "combine" generally may refer to an arbitrary operation in which two or more components such as signals are one or more of mathematically merged in order to form at least one merged combined signal and/or compared in order to form at least one comparison signal or comparison result. As an example, Q may simply be determined as $Q=s_1/s_2$ or $Q=s_2/s_1$, with $s_1$ denoting a first one of the sensor signals and $s_2$ denoting a second one of the sensor signals. Additionally or alternatively, Q may be determined as $Q=j \cdot s1/k \cdot s_2$ or $Q=k \cdot s_2/j \cdot s_1$, with j and k being real numbers which, as an example, may be predetermined or determinable. Additionally or alternatively, Q may be determined as $Q=(j \cdot s_1+k \cdot s_2)/(p \cdot s_1+q \cdot s_2)$, with j, k, p and q being real numbers which, as an example, may be predetermined or determinable. As a simple example for the latter, Q may be determined as $Q=s_1/(s_1+s_2)$, or, as a further example, Q may be determined as $Q=(s_1-s_2)/(s_1+s_2)$. Other quotient signals are feasible. Thus, as an example, in case more than two optical sensors are provided, the above-mentioned quotient formation may take place between two of the sensor signals generated by these optical sensors or may take place between more than two of the sensor signals. Thus, instead of using the first one of the sensor signals and the second one of the sensor signals in the formulae given above, combined sensor signals may be used for quotient formation.

In typical setups, commercially available quadrant diodes such as quadrant photodiodes are used for positioning, i.e. for adjusting and/or measuring a transversal coordinate of a light spot in the plane of the quadrant photodiode. Thus, as an example, laser beam positioning by using quadrant photodiodes is well known. According to a typical prejudice, however, quadrant photodiodes are used for xy-positioning, only. According to this assumption, quadrant photodiodes are not suitable for measuring distances. The above-mentioned findings, however, using an off-centered quadrant photodiode with regard to an optical axis of the receiver unit, show otherwise, as will be shown in further measurements below. Thus, as indicated above, in quadrant photodiodes, the asymmetry of the spot can be measured by shifting the quadrant diode slightly off-axis, such as by the above-mentioned offset. Thereby, a monotonously z-dependent function may be generated, such as by forming the combined signal Q of two or more of the sensor signals of two or more partial photodiodes, i.e. quadrants, of the quadrant photodiode. Therein, in principle, only two photodiodes are necessary for the measurement. The other two diodes may be used for noise cancellation or to obtain a more precise measurement. In addition or as an alternative to using a quadrant diode or quadrant photodiode, other types of optical sensors may be used. Thus, as will be shown in further detail below, staggered optical sensors may be used.

The use of quadrant diodes provides a large number of advantages over known optical detectors. Thus, quadrant diodes are used in a large number of applications in combination with LEDs or active targets and are widely commercially available at very low price, with various optical properties such as spectral sensitivities and in various sizes. No specific manufacturing process has to be established, since commercially available products may be implemented into the receiver unit. In case a quadrant diode is used, the quadrant diode may also be used for additional purposes. Thus, the quadrant diode may also be used for conventional x-y-measurements of a light spot, as generally known in the art of optoelectronics and laser physics. Thus, as an example, the lens or receiver unit position can be adjusted using the conventional xy-position information of the quadrant diode to optimize the position of the spot for the distance measurement. As a practical example, the light spot, initially, may be located right in the center of the quadrant diode, which typically does not allow for the above-mentioned distance measurement using the combined signal Q. Thus, firstly, conventional quadrant photodiode techniques may be used for off-centering a position of the light spot on the quadrant photodiode, such that, e.g., the spot position on the quadrant diode is optimal for the measurement. Thus, as an example, the different off-centering of the optical sensors may simply be a starting point for movement of the optical sensors relative to the optical axis such that the light spot is off-centered with respect to the optical axis and with respect to a geometrical center of the array of the optical sensors.

Thus, generally, the optical sensors may form a sensor array or may be part of a sensor array, such as the above-mentioned quadrant diode. Thus, as an example, the receiver unit may comprise the array of optical sensors, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that $0.3 \leq m/n \leq 3$, such as by choosing $m/n=1:1$, 4:3, 16:9 or similar. As an example, the array may be a square array, having an equal number of rows and columns, such as by choosing m=2, n=2 or m=3, n=3 or the like. The case m=2, n=2 is the case of the quadrant diode or quadrant optical sensor, which, for practical reasons, is one of the preferred cases, since quadrant photodiodes are widely available.

As a starting point, a geometrical center of the optical sensors within the array may be off-centered from the optical axis, such as by the above-mentioned offset. The sensor array specifically may be movable relative to the optical axis, for example along a gradient, preferably automatically, such as by moving the sensor array, e.g. in a plane perpendicular to the optical axis, and/or by moving the optical axis itself, e.g. shifting the optical axis in a parallel shift and/or tilting the optical axis. Thus, the sensor array may be shifted in order to adjust a position of a light spot generated by the light beam in the plane of the sensor array. Additionally or alternatively, the optical axis may be shifted and/or tilted by using appropriate elements, such as by using one or more deflection elements and/or one or more lenses. The movement, as an example, may take place by using one or more appropriate actuators, such as one or more piezo actuators and/or one or more electromagnetic actuators and/or one or more pneumatic or mechanical actuators, which, e.g., move and/or shift the array and/or move and/or shift and/or tillage one or more optical elements in the beam path in order to move the optical axis, such as parallel shifting the optical axis and/or tilting the optical axis. The evaluation device specifically may be adjusted to control a relative position of the sensor array to the optical axis, e.g. in the plane perpendicular to the optical axis. An adjustment procedure may take place in that the evaluation device is configured for, firstly, determining the at least one transversal position of a light spot generated by the light beam on the sensor array by using the sensor signals and for, secondly, moving the array relative to the optical axis, such as by moving the array and/or the optical axis, e.g. by moving the array in the plane to the optical axis until the light spot is off-centered and/or by tilting a lens until the light spot is off-centered. As used therein, a transversal position may be a position in a plane perpendicular to the optical axis, which may also be referred to as the x-y-plane. For the measurement of the transversal coordinate, as an example, the sensor signals of the optical sensors may be compared. As an example, in case the sensor signals are found to be equal and, thus, in case it is determined that the light spot is located symmetrically with respect to the optical sensors, such as in the center of the quadrant diodes, a shifting of the array and/or a tilting of a lens may take place, in order to off-center the light spot in the array. Thus, as outlined above, the off-centering of the array from the optical axis, such as by off-centering the center of the quadrant photodiode from the optical axis, may simply be a starting point in order to avoid the situation which is typical, in which the light spot is located on the optical axis and, thus, is centered. By off-centering the array relative to the optical axis, thus, the light spot should be off-centered. In case this is found not to be true, such that the light spot, incidentally, is located in the center of the array and equally illuminates all optical sensors, the above-mentioned shifting of the array relative to the optical axis may take place, preferably automatically, in order to off-center the light spot on the array. Thereby, a reliable distance measurement may take place.

Further, the use of the above-mentioned combined signal Q is a very reliable method for distance measurements. Since, on the other hand, the size or diameter of the light beam is dependent on a distance between the sender unit, from which the light beam propagates towards the receiver unit, and the receiver unit itself, i.e. dependent on the longitudinal coordinate of the sender unit, a unique and unambiguous relationship between the first and second sensor signals and the longitudinal coordinate may exist. For the latter, reference e.g. may be made to one or more of the above-mentioned prior art documents, such as WO 2014/097181 A1. The predetermined relationship may be determined by analytical considerations, such as by assuming a linear combination of Gaussian light beams, by empirical measurements, such as measurements measuring the first and second sensor signals or a secondary signal derived thereof as a function of the longitudinal coordinate, or both.

As outlined above, specifically, quadrant photodiodes may be used. As an example, commercially available quadrant photodiodes may be integrated in order to provide four optical sensors, such as one or more quadrant photodiodes available from Hamamatsu Photonics Deutschland GmbH, D-82211 Herrsching am Ammersee, Germany, such as quadrant Si PIN photodiodes of the type S4349, which are sensitive in the UV spectral range to the near IR spectral range. In case an array of optical sensors is used, the array may be a naked chip or may be an encapsulated array, such as encapsulated in a TO-5 metal package. Additionally or alternatively, a surface mounted device may be used, such as TT Electronics OPR5911 available from TT Electronics plc, Fourth Floor, St Andrews House, West Street Woking Surrey, GU21 6EB, England. It shall be noted that other optical sensors may also be used.

Further, it shall be noted that, besides the option of using precisely one quadrant photodiode, two or more quadrant photodiodes may also be used. Thus, as an example, a first quadrant photodiode may be used for the distance measurement, as described above, providing the two or more optical sensors. Another quadrant photodiode may be used, e.g. in a second partial beam path split off from the beam path of the first quadrant photodiode, for a transversal position measurement, such as for using at least one transversal coordinate x and/or y. The second quadrant photodiode, as an example, may be located on-axis with respect to the optical axis.

Further, it shall be noted that, besides the option of using one or more quadrant photodiodes, one or more quadrant photodiodes or further photodiode arrays may also be replaced or mimicked by separated photodiodes that are arranged or assembled close to each other, preferably in a symmetric shape such as a rectangular matrix, such as a 2×2 matrix. However further arrangements are feasible. In such an arrangement or assembly, the photodiodes may be arranged or assembled in a housing or mount, such as all photodiodes in a single housing or mount or groups of photodiodes in one housing or mount, or each of the photodiodes in a separate housing or mount. Further, the photodiodes may also be assembled directly on a circuit board. In such arrangements or assemblies, photodiodes may be arranged as such that the separation between the active area of the photodiodes, has a distinct value less than one centimeter, preferably less than one millimeter, more preferably as small as possible. Further, to avoid optical reflexes, distortions, or the like that may deteriorate the measurement, the space between the active areas may be either empty or filled with a material, preferably with a light absorbing material such as a black polymer, such as black silicon, black polyoxymethylene, or the like, more preferably optically absorbing and electrically insulating material, such as black ceramics or insulating black polymers such as black silicon, or the like. Further, the distinct value of the photodiode separation may also be realized by adding a distinct building block between the photodiodes such as a plastic separator. Further embodiments are feasible. The replacement of quadrant photodiodes by single diodes arranged in a similar setup such as in a 2×2 rectangular matrix with minimal distance between the active areas may further minimize the costs for the optical detector. Further, two or more diodes from a quadrant diode may be connected in parallel or in series to form a single light sensitive area.

The receiver unit furthermore may comprise at least one angle dependent optical element adapted to adapt the light beam travelling from the sender unit to the receiver unit to have a beam profile depending on an angle of incidence of the light beam when impinging on the angle dependent optical element. The angle dependent optical element may comprise at least one optical element selected from the group consisting of: at least one optical fiber, in particular at least one multifurcated optical fiber, in particular at least one bifurcated optical fiber; at least one lens array arranged in at least one plane perpendicular to an optical axis of the receiver unit, in particular at least one microlens array; at least one optical interference filter; at least one nonlinear optical element, in particular one birefringent optical element; at least one liquid crystal filter; at least one polarization filter. Each of the optical sensor may be designed to generate at least one sensor signal in response to an illumination of its respective light-sensitive area by the light beam generated by the angle dependent optical element. The evaluation device may be configured for determining at least one longitudinal coordinate z of the sender unit by evaluating the combined signal Q from the sensor signals.

As used herein, the term "angle dependent optical element" refers to an optical element adapted to adapt the light beam generated by the sender unit to have a beam profile depending on the angle of incidence when impinging on the angle dependent optical element. In particular, the angle dependent optical element may be adapted to influence and/or change and/or adjust the beam profile of the incident light beam. For example, the angle dependent optical element may have one or more of angle dependent transmission properties, angle dependent reflection properties or angle dependent absorption properties. The angle of incidence may be measured with respect to an optical axis of the angle dependent optical element.

An electromagnetic wave impinging on a first side, for example a surface and/or an entrance, of the angle dependent optical element may be partly, depending on the properties of the angle dependent optical element, absorbed and/or reflected and/or transmitted. The term "absorption" refers to a reduction of power and/or intensity of the incident light beam by the angle dependent optical element. For example, the power and/or intensity of the incident light beam may be transformed by the angle dependent optical element to heat or another type of energy. As used herein, the term "transmission" refers to a part of the electromagnetic wave which is measurable outside the angle dependent optical element in a half-space with angles from 90° and higher with respect to the optical axis. For example, transmission may be a remaining part of the electromagnetic wave impinging on the first side of the angle dependent optical element, penetrating the angle dependent optical element and leaving the angle dependent optical element at a second side, for example an opposite side and/or an exit. The term "reflection" refers to a part of the electromagnetic wave which is measurable outside the angle dependent optical element in a half-space with angles below 90° with respect to the optical axis. For example, reflection may be a change in direction of a wavefront of the incident light beam due to interaction with the angle dependent optical element.

The total power of the electromagnetic wave impinging on the angle dependent optical element may be distributed by the angle dependent optical element in at least three components, i.e. an absorption component, a reflection component and a transmission component. A degree of transmission may be defined as power of the transmission component normalized by the total power of the electromagnetic wave impinging on the angle dependent optical element. A degree of absorption may be defined as power of the absorption component normalized by the total power of the electromagnetic wave impinging on the angle dependent optical element. A degree of reflection may be defined as power of the reflection component normalized by the total power of the electromagnetic wave impinging on the angle dependent optical element.

As used herein, "angle dependent transmission" refers to the fact that the degree of transmission depends on the angle of incidence at which the incident light beam impinges on the angle dependent optical element. The angle dependent optical element may be arranged in the direction of propagation behind at least one transfer device. The angle dependent optical element and the transfer device may be arranged such that the light beam passes through the transfer device before impinging on the angle dependent optical element. The angle dependent optical element may be arranged as such, that the light beam impinges on the angle dependent optical element between the transfer device and the focal point of the transfer device. Use of at least one transfer device allows to further enhance robustness of the measurement of the longitudinal coordinate. The transfer device may, for example, comprise at least one collimating lens. The angle dependent optical element may be designed to weaken rays impinging with larger angles compared to rays impinging with a smaller angle. For example, the degree of transmission may be highest for light rays parallel to the optical axis, i.e. at 0°, and may decrease for higher angles. In particular, at at least one cut-off angle the degree of transmission may steeply fall to zero. Thus, light rays having a large angle of incidence may be cut-off.

As used herein, the term "angle dependent absorption" refers to the fact that the degree of absorption depends on the angle of incidence at which the incident light beam impinges on the angle dependent optical element. As used herein, the term "angle dependent absorption" refers to the fact that a degree of absorption depends on the angle of incidence at which the incident light beam impinges on the angle dependent optical element. For example, photon energy and/or intensity of the light beam propagating from the sender unit to the receiver unit may be reduced depending on the angle of incidence. As used herein, the term "angle dependent reflection" refers to the fact that the degree of reflection depends on the angle of incidence at which the incident light beam impinges on the angle dependent optical element.

For example, the angle dependent optical element comprises at least one optical fiber. Specifically, the angle dependent optical element comprises at least one optical measurement fiber. The optical fiber may be designed such that the degree of transmission may be highest for incoming light rays parallel, i.e. at an angle of 0°, to the optical fiber, neglecting reflection effects. The optical fiber may be designed such that for higher angles, for example angles from 1° to 10°, the degree of transmission may decrease smoothly to around 80% of the degree of transmission for parallel light rays and may remain at this level constantly up to an acceptance angle of the optical fiber. As used herein, the term "acceptance angle" may refer to an angle above which total reflection within the optical fiber is not possible such that the light rays are reflected out of the optical fiber. The optical fiber may be designed that at the acceptance angle, the degree of transmission may steeply fall to zero. Light rays having a large angle of incidence may be cut-off.

The optical fiber may be adapted to transmit at least parts of the incident light beam which are not absorbed and/or reflected, between two ends of the optical fiber. The optical fiber may have a length and may be adapted to permit transmission over a distance. The optical fiber may comprise at least one material selected from the group consisting of: silica, aluminosilicate glass, germane silicate glass, fluorozirconate, rare earth doped glass, fluoride glass, chalcogenide glasses, sapphire, doped variants, especially for silica glass, phosphate glass, PMMA, polystyrene, fluoropolymers such as poly(perfluoro-butenylvinyl ether), or the like. The optical fiber may be a single or multi-mode fiber. The optical fiber may be a step index fiber, a polarizing fiber, a polarization maintaining fiber, a plastic optical fiber or the like. The optical fiber may comprise at least one fiber core which is surrounded by at least one fiber cladding having a lower index of refraction as the fiber core. The fiber cladding may also be a double or multiple cladding. The fiber cladding may comprise a so-called outer jacket. The fiber cladding may be coated by a so-called buffer adapted to protect the optical fiber from damages and moisture. The buffer may comprise at least one UV-cured urethane acrylate composite and/or at least one polyimide material. In one embodiment, a refractive index of the fiber core may be higher than the refractive index of the fiber cladding material and the optical fiber may be adapted to guide the incoming light beam by total internal reflection below the angle of acceptance. In one embodiment, the optical fiber may comprise at least one hollow core fiber, also called photonic bandgap fiber. The hollow-core fiber may be adapted to guide the incoming light beam essentially within a so-called hollow region, wherein a minor portion of the light beam is lost due to propagation into the fiber cladding material.

The optical fiber may comprise one or more fiber connectors at the end of the fiber. The optical fiber may comprise end caps such as coreless end caps. The optical fiber may comprise one or more of a fiber coupler, a fiber Bragg grating, a fiber polarizer, a fiber amplifier, a fiber coupled diode laser, a fiber collimator, a fiber joint, a fiber splicing, a fiber connector, a mechanical splicing, a fusion splicing, or the like. The optical fiber may comprise a polymer coating.

The optical fiber may comprise at least two or more fibers. The optical fiber may be at least one multifurcated optical fiber, in particular at least one bifurcated optical fiber. For example, the bifurcated optical fiber may comprise two fibers, in particular at least one first fiber and at least one second fiber. The first fiber and the second fiber may be arranged close to each other at an entrance end of the bifurcated optical fiber and may split into two legs separated by a distance at an exit end of the bifurcated optical fiber. The first and second fiber may be designed as fibers having identical properties or may be fibers of different type. The first fiber may be adapted to generate at least one first transmission light beam and the second fiber may be adapted to generate at least one second transmission light beam. The bifurcated optical fiber may be arranged such that the incident light beam may impinge at a first angle of incidence into the first fiber and at a second angle of incidence, different from the first angle, into the second fiber, such that the degree of transmission is different for the first transmission light beam and the second transmission light beam. One of the optical sensors may be arranged at an exit end of the first fiber and the other optical sensor may be arranged at an exit end of the second fiber. The optical fiber may comprise more than two fibers, for example three, four or more fibers. For example, the multifurcated may comprise multiple fibers wherein each fiber may comprise at least one of a core, a cladding, a buffer, a jacket, and one or more fibers may partially or entirely be bundled by a further jacket such as a polymer hose to ensure that the fibers stay close to each other such as at one end of the fiber. All optical fibers may have the same numerical aperture. All optical fibers may be arranged as such, that the light beam propagating from the sender unit to the receiver unit impinges on all of the optical fibers between the transfer device and the focal point of the transfer device. The optical fibers may be arranged as such, that the position along the optical axis where the light beam propagating from the sender unit to the receiver unit impinges on the optical fibers is identical for all optical fibers. Other arrangements may be possible.

The receiver unit may comprise a plurality of optical fibers, for example a plurality of single optical fibers or a plurality of multifurcated optical fibers. For example, the optical fibers may be arranged in a bundle of optical fibers. For example, the receiver unit may comprise a plurality of single optical fibers, for example optical fibers having identical properties. The optical fibers, i.e. the single optical fibers or multifurcated optical fibers, may be arranged such that the incident light beam may impinge at different angles of incidence into each of the optical fibers such that the degree of transmission is different for each of the optical fibers. At the exit ends of each optical fiber at least one optical sensor may be arranged. Alternatively, at least two or more of the optical fibers may use the same optical sensor. The optical sensors at the end of the optical fibers may be arranged as such that at least 80%, preferably at least 90%, more preferably at least 99% of the luminance power of the light beams exiting the optical fiber towards the optical sensors impinge on at least one optical sensor. In case the angle dependent optical element is an optical fiber, the relevant position of the angle dependent optical element and/or the optical sensor relative to the transfer device to optimize the combined signal Q may be given by the position where the light beam travelling from the sender unit to the receiver unit impinges on the angle dependent optical element. In particular, the position relative to the transfer device where the light beam travelling from the sender unit to the receiver unit impinges on the optical fiber may be optimized to obtain a combined signal Q with a high dynamic range. Further, concerning the optimization of the optical setup, in case the angle dependent optical element is an optical fiber, the position where the light beam impinges on the optical fiber corresponds to the position where the light beam impinges on the optical sensor in case the angle dependent optical element is not a fiber, such as an interference filter.

In a further aspect, the present invention discloses a method for optically surveilling at least one area by using at least one device comprising a sender unit and a receiver unit. The device may be a device according to the present invention, such as according to one or more of the embodiments referring to a device for optically surveillance as disclosed above or as disclosed in further detail below. Still, other types of devices may be used. The method comprises the following method steps, wherein the method steps may be performed in the given order or may be performed in a different order. Further, one or more additional method steps may be present which are not listed. Further, one, more than one or even all of the method steps may be performed repeatedly.

The method comprises the following steps:
  providing a sender unit having at least one illumination source, wherein the illumination source is designed to generate at least one light beam, each light beam having a beam profile, wherein each light beam is designated for propagating to the receiver unit, thereby traversing the at least one area for surveillance;
  providing a receiver unit having at least one transfer device, at least two optical sensors and an evaluation device, wherein the transfer device has at least one focal length in response to the at least one incident light beam propagating from the illumination source to at least two optical sensors, wherein the transfer device has an optical axis, wherein the transfer device constitutes a coordinate system, wherein a longitudinal coordinate I is a coordinate along the optical axis and wherein d is a spatial offset from the optical axis, wherein each optical sensor has at least one light sensitive area, wherein each optical sensor is designed to generate at least one sensor signal in response to an illumination of its respective light-sensitive area by the light beam, wherein two of the optical sensors are arranged in a manner that the light-sensitive areas of the two optical sensors differ in at least one of: their longitudinal coordinate, their spatial offset, or their surface areas;

generating the at least one light beam for illuminating each of the light-sensitive areas of the at least two optical sensors of the receiver unit with the light beam propagating from the sender unit to the receiver unit, thereby traversing at least one area for surveillance, wherein, thereby, each of the light-sensitive areas generates at least one sensor signal; and evaluating the sensor signals, thereby, generating an output by monitoring at least one change of, firstly, the beam profile of the at least one light beam upon traversing the at least one area of surveillance by evaluating the sensor signals and, further, of at least one component of a location of the sender unit, wherein the component is determined with respect to the coordinate system of the transfer device, by evaluating a combined signal Q from the sensor signals.

The method may further comprise initiating at least one action based on the output, wherein the at least one action is selected format least one of: providing at least one information, generating at least one warning, inducing at least one instruction, changing an output signal. For details, options and definitions, reference may be made to the device as discussed above.

In a further aspect of the present invention, use of the device according to the present invention, such as according to one or more of the embodiments given above or given in further detail below, is proposed, for a purpose of use, selected from the group consisting of: monitoring at least one apparatus located in a surveillance area; distinguishing between a willful manipulation from an not intentional manipulation related to the at least one apparatus located in the surveillance area; indicating a failure of a safety function.

With respect to further uses of the device according to the present invention reference is made to in WO 2018/091649 A1, WO 2018/091638 A1 and WO 2018/091640, the content of which is included by reference.

Overall, in the context of the present invention, the following embodiments are regarded as preferred:

Embodiment 1: A device for optically surveilling at least one area, the device comprising a sender unit and a receiver unit, wherein the sender unit has at least one illumination source, wherein the illumination source is designed to generate at least one light beam having a beam profile, wherein each light beam is designated for propagating to the receiver unit, thereby traversing at least one area for surveillance;

wherein the receiver unit comprises at least one transfer device, wherein the transfer device has at least one focal length in response to the at least one incident light beam propagating from the illumination source to at least two optical sensors, wherein the transfer device has an optical axis, wherein the transfer device constitutes a coordinate system, wherein a longitudinal coordinate I is a coordinate along the optical axis and wherein d is a spatial offset from the optical axis, at least two optical sensors, wherein each optical sensor has at least one light sensitive area, wherein each optical sensor is designed to generate at least one sensor signal in response to an illumination of its respective light-sensitive area by the light beam, wherein two of the optical sensors are arranged in a manner that the light-sensitive areas of the two optical sensors differ in at least one of: their longitudinal coordinate, their spatial offset, or their surface areas; and at least one evaluation device, wherein the evaluation device is being configured for generating an output by monitoring at least one change of, firstly, the beam profile of the at least one light beam upon traversing the at least one area of surveillance by evaluating the sensor signals and, further, of at least one component of a location of the sender unit, wherein the component is determined with respect to the coordinate system of the transfer device, by evaluating a combined signal Q from the sensor signals.

Embodiment 2: The device according to the preceding embodiment, wherein the evaluation device is further configured for initiating at least one action based on the output, wherein the at least one action is selected from at least one of: providing at least one information, generating at least one warning, inducing at least one instruction, changing an output signal.

Embodiment 3: The device according to the preceding embodiment, wherein the evaluation device is further configured for assigning the information to a time of event and for storing a combination of the information with the time of event in an information log.

Embodiment 4: The device according to any one of the two preceding embodiments, wherein the warning comprises a visual, an audible or a haptic warning signal.

Embodiment 5: The device according to any one of the three preceding embodiments, wherein the instruction comprises initiating a shutdown of at least one apparatus.

Embodiment 6: The device according to any one of the preceding embodiments, wherein the sender unit further comprises at least one modulation source, the modulation source being configured for generating a modulation pattern in a manner that the modulation source impinges the illumination source to generate at least one light beam carrying the modulation pattern.

Embodiment 7: The device according to the preceding embodiment, wherein the modulation pattern is selected from the group consisting of: a pseudo random modulation pattern, an Aiken code, a BCD code, a Gillham code, a Stibitz code, a one-hot code, and a gray code.

Embodiment: 8 The device according to any one of the two preceding embodiments, wherein the modulation pattern is selected from the group consisting of: a rectangular pulse pattern, 50:50 rectangular pattern, sinusoidal pattern, periodic pulse patterns.

Embodiment 9: The device according to any one of the two preceding embodiments, wherein the sender unit comprises at least two illumination sources, wherein each of the illumination sources is designed for being modulated by an individual modulation pattern, the individual modulation pattern of two illumination sources being different with respect to each other.

Embodiment 10: The device according to any one of the three preceding embodiments, wherein the sender unit comprises an individual modulation source for each illumination source, or wherein the sender unit further comprises a multiplexer being designated for switching an individual impingement of at least two of the illumination sources by a single modulation source.

Embodiment 11: The device according to any one of the two preceding embodiments, wherein the evaluation device is designated for assigning an individual modulation pattern to an individual illumination source.

Embodiment 12: The device according to any one of the preceding embodiments, further comprising a connection between the sender unit and the receiver unit, wherein the connection is designed for providing synchronization between the sender unit and the receiver unit.

Embodiment 13: The device according to any one of the preceding embodiments, further comprising at least one reflective target designed for being impinged by the at least one light beam propagating from the at least one illumination source to the at least two optical sensors.

Embodiment 14: The device according to any one of the preceding embodiments, wherein two of the optical sensors are arranged as
- at least one first optical sensor having a first light-sensitive area, wherein the first optical sensor is configured to generate at least one first sensor signal in response to an illumination of the first light-sensitive area by the light beam propagating from the sender unit to the receiver unit; and
- at least one second optical sensor having a second light-sensitive area, wherein the second optical sensor is configured to generate at least one second sensor signal in response to an illumination of the second light-sensitive area by the light beam, wherein the first light-sensitive area is smaller than the second light-sensitive area;

wherein the evaluation device is being configured for generating the output by evaluating the first and second sensor signals.

Embodiment 15: The device according to the preceding embodiment, wherein the evaluation device is further designed for generating the at least one output by monitoring a change of the first sensor signal or of the second sensor signal.

Embodiment 16: The device according to any one of the preceding embodiments, wherein the sender unit and the receiver unit are arranged with respect to each other in a manner that the sensor signal of at least one of the optical sensors is a highest sensor signal.

Embodiment 17: The device according to any one of the preceding embodiments, wherein the evaluation device is further designed for generating the output by using at least one reference beam profile for the at least one light beam generated by the illumination source and at least one reference component for the at least one component of the location of the sender unit.

Embodiment 18: The device according to the preceding embodiment, wherein the at least one reference beam profile and the at least one reference component are stored during a teaching phase.

Embodiment 19: A method for optically surveilling at least one area by using at least one device comprising a sender unit and a receiver unit, the method comprising the following steps:
- providing a sender unit having at least one illumination source, wherein the illumination source is designed to generate at least one light beam, each light beam having a beam profile, wherein each light beam is designated for propagating to the receiver unit, thereby traversing the at least one area for surveillance;
- providing a receiver unit having at least one transfer device, at least two optical sensors and an evaluation device, wherein the transfer device has at least one focal length in response to the at least one incident light beam propagating from the illumination source to at least two optical sensors, wherein the transfer device has an optical axis, wherein the transfer device constitutes a coordinate system, wherein a longitudinal coordinate l is a coordinate along the optical axis and wherein d is a spatial offset from the optical axis, wherein each optical sensor has at least one light sensitive area, wherein each optical sensor is designed to generate at least one sensor signal in response to an illumination of its respective light-sensitive area by the light beam, wherein two of the optical sensors are arranged in a manner that the light-sensitive areas of the two optical sensors differ in at least one of: their longitudinal coordinate, their spatial offset, or their surface areas;
- generating the at least one light beam for illuminating each of the light-sensitive areas of the at least two optical sensors of the receiver unit with the light beam propagating from the sender unit to the receiver unit, thereby traversing at least one area for surveillance, wherein, thereby, each of the light-sensitive areas generates at least one sensor signal; and
- evaluating the sensor signals, thereby, generating an output by monitoring at least one change of, firstly, the beam profile of the at least one light beam upon traversing the at least one area of surveillance by evaluating the sensor signals and, further, of at least one component of a location of the sender unit, wherein the component is determined with respect to the coordinate system of the transfer device, by evaluating a combined signal Q from the sensor signals.

Embodiment 20: The method according to the preceding embodiment, further comprising initiating at least one action based on the output, wherein the at least one action is selected from at least one of: providing at least one information, generating at least one warning, inducing at least one instruction, changing an output signal.

Embodiment 21: A use of a device according to any one of the preceding embodiments referring to a device, for a purpose of use, selected from the group consisting of: monitoring at least one apparatus located in a surveillance area; distinguishing between a willful manipulation from a not intentional manipulation related to the at least one apparatus located in the surveillance area; indicating a failure of a safety function.

BRIEF DESCRIPTION OF THE FIGURES

Further optional details and features of the invention are evident from the description of preferred exemplary embodiments which follows in conjunction with the dependent claims. In this context, the particular features may be implemented in an isolated fashion or in combination with other features. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures.

DETAILED DESCRIPTION OF THE EMBODIMENTS

Figure 1:
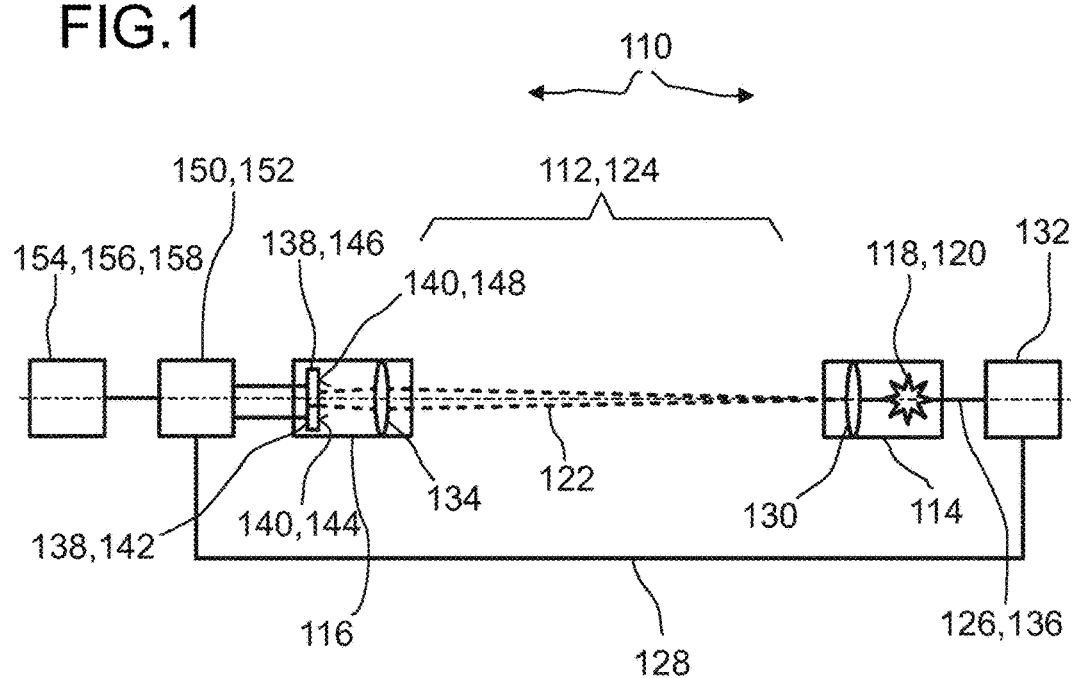
FIG. 1 shows a first exemplary embodiment of a device for optically surveillance according to the present invention.

FIG. 1 shows a first exemplary embodiment of a device 110 for optically surveilling at least one area 112. In the embodiment of FIG. 1, the device 110 may be designed as light barrier, specifically as one-way light barrier. The device 110 comprises a sender unit 114 and a receiver unit 116. The sender unit 114 comprises at least one illumination source 118. The illumination source 118 may be or may comprise at least one light source 120. The light source 120 may be or may comprise at least one multiple beam light source. For example, the light source may comprise at least one laser source and one or more diffractive optical elements (DOEs). The illumination source 118 is designed to generate at least one light beam 122 having a beam profile. Each light beam 122 is designated for propagating to the receiver unit 116, thereby traversing at least one area for surveillance 124. The device 110 may be configured such that the light beam 122 propagates from the sender unit 114 towards the receiver unit 116 along an optical axis 126 of the device 110.

The device 110 may comprise a connection 128 between the sender unit 114 and the receiver unit 116. The connection may be designed for providing synchronization between the sender unit 144 and the receiver unit 116. The synchronization between the sender unit 114 and the receiver unit 116 may be wire bound and/or may be implemented using at least one optical synchronization path. Preferably, the connection may be a wireless connection such that a wire bound connection is not necessary. The connection 128 may furthermore be configured for tech-in and/or safety functions.

Specifically, the illumination source 118 may comprise at least one laser and/or laser source. Various types of lasers may be employed, such as semiconductor lasers. Additionally or alternatively, non-laser light sources may be used, such as LEDs and/or light bulbs. The illumination source 118 may be adapted to generate and/or to project a cloud of points, for example the illumination source 128 may comprise one or more of at least one digital light processing projector, at least one LCoS projector, at least one spatial light modulator; at least one diffractive optical element; at least one array of light emitting diodes; at least one array of laser light sources. The illumination source 118 may comprise an artificial illumination source, in particular at least one laser source and/or at least one incandescent lamp and/or at least one semiconductor light source, for example, at least one light-emitting diode, in particular an organic and/or inorganic light-emitting diode. As an example, the light emitted by the illumination source 118 may have a wavelength of 300 to 1000 nm, especially 500 to 1000 nm. Additionally or alternatively, light in the infrared spectral range may be used, such as in the range of 780 nm to 3.0 µm. Specifically, the light in the part of the near infrared region where silicon photodiodes are applicable specifically in the range of 700 nm to 1000 nm may be used. On account of their generally defined beam profiles and other properties of handleability, the use of at least one laser source as the illumination source is particularly preferred. The illumination source 118 may be integrated into a housing of the device 110 for optically surveilling.

The light beam 122 traversing the surveillance area 124 may be less collimated, e.g. the light beam may slightly expand with distance from the illumination source 118, which allows facilitating the setup of the light barrier. The sender unit 114 may comprise at least one transfer device 130 configured for collimating the light beam generated by the light source 122.

The sender unit 114 further may comprise at least one modulation source 132, also denoted as modulation device. The modulation source 132 may be configured for generating a modulation pattern in a manner that the modulation source 132 impinges the illumination source 118 to generate at least one light beam carrying the modulation pattern. The modulation pattern may be selected from the group comprising of: a pseudo random modulation pattern, an Aiken code, a BCD code, a Gillham code, a Stibitz code, a one-hot code, and a gray code. The modulation pattern may be selected from the group consisting of: a rectangular pulse pattern, 50:50 rectangular pattern, sinusoidal pattern, periodic pulse patterns. Compared to the optoelectronic sensor described in DE 10 2016 122 364 A1 the sender unit may use more complex modulation patterns to encode the light source. This may allow that the receiver unit 116 detects the light beam 122 which was send by the sender unit 114.

The receiver unit 116 comprises at least one transfer device 134. The transfer device 134 has at least one focal length in response to the at least one incident light beam 122 propagating from the illumination source 118 to at least two optical sensors 138. The transfer device 134 has an optical axis 136. The transfer device 134 constitutes a coordinate system, wherein a longitudinal coordinate l is a coordinate along the optical axis 136 and wherein d is a spatial offset from the optical axis 136.

The receiver unit 116 comprises the at least two optical sensors 138. Each optical sensor 138 has at least one light sensitive area 140. Each optical sensor 138 is designed to generate at least one sensor signal in response to an illumination of its respective light-sensitive area 140 by the light beam 122. As shown in FIG. 1, the light-sensitive areas 140 may be oriented towards the sender unit 114, specifically for one-way light barriers. The optical sensors 138 are arranged such that the light-sensitive areas 140 of the optical sensors 138 differ in at least one of: their longitudinal coordinate, their spatial offset, or their surface areas. Each light-sensitive area 140 may have a geometrical center.

The optical sensors 138 may be sensitive in one or more of the ultraviolet, the visible or the infrared spectral range. Specifically, the optical sensors 138 may be sensitive in the visible spectral range from 500 nm to 780 nm, most preferably at 650 nm to 750 nm or at 690 nm to 700 nm. Specifically, the optical sensors 138 may be sensitive in the near infrared region. Specifically, the optical sensors 138 may be sensitive in the part of the near infrared region where silicon photodiodes are applicable specifically in the range of 700 nm to 1000 nm. The optical sensors 138, specifically, may be sensitive in the infrared spectral range, specifically in the range of 780 nm to 3.0 micrometers. For example, the optical sensors 138 each, independently, may be or may comprise at least one element selected from the group consisting of a photodiode, a photocell, a photoconductor, a phototransistor or any combination thereof. For example, the optical sensors 138 may be or may comprise at least one element selected from the group consisting of a CCD sensor element, a CMOS sensor element, a photodiode, a photocell, a photoconductor, a phototransistor or any combination thereof. Any other type of photosensitive element may be used. As will be outlined in further detail below, the photosensitive element generally may fully or partially be made of inorganic materials and/or may fully or partially be made of organic materials. Most commonly, as will be outlined in further detail below, one or more photodiodes may be used, such as commercially available photodiodes, e.g. inorganic semiconductor photodiodes. Specifically, the photosensitive element may be or may comprise at least one element selected from the group consisting of a photodiode, a photocell, a photoconductor, a phototransistor or any combination thereof. Any other type of photosensitive element may be used.

The optical sensors 138 specifically may be semiconductor sensors, preferably inorganic semiconductor sensors, more preferably photodiodes and most preferably silicon photodiodes. Thus, the present invention simply may be realized by using commercially available inorganic photodiodes, i.e. one small photodiode and one large area photodiode. Thus, the setup of the present invention may be realized in a cheap and inexpensive fashion. Specifically, the optical sensors 138 may be or may comprise inorganic photodiodes which are sensitive in the infrared spectral range, preferably in the range of 780 nm to 3.0 micrometers, and/or sensitive in the visible spectral range, preferably in the range of 380 nm to 780 nm. Specifically, the optical sensors 138 may be sensitive in the part of the near infrared region where silicon photodiodes are applicable specifically in the range of 700 nm to 1000 nm. Infrared optical sensors which may be used for the optical may be commercially available infrared optical sensors, such as infrared optical sensors commercially available under the brand name Hertzstueck™ from trinamiX GmbH, D-67056 Ludwigshafen am Rhein, Germany. Thus, as an example, the optical sensors 138 may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, the optical sensors may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, the optical sensors may comprise at least one at least one photoconductive sensor such as a PbS or PbSe sensor, a bolometer, preferably a bolometer selected from the group consisting of a VO bolometer and an amorphous Si bolometer. The optical sensors 138 may be opaque, transparent or semitransparent. For the sake of simplicity, however, opaque sensors which are not transparent for the light beam, may be used, since these opaque sensors generally are widely commercially available. The optical sensors 138 specifically may be uniform sensor having a single light-sensitive area 140. The optical sensors 138 specifically may be non-pixelated optical sensors. Alternatively, one or both of the optical sensors 138 may be pixelated sensors.

The receiver unit 116 may comprise two optical sensors 138 which may be arranged as follows at least one first optical sensor 142 having a first light-sensitive area 144, wherein the first optical sensor 142 is configured to generate at least one first sensor signal in response to an illumination of the first light-sensitive area 144 by the light beam 122 propagating from the sender unit 114 to the receiver unit 116; and at least one second optical sensor 146 having a second light-sensitive area 148, wherein the second optical sensor 146 is configured to generate at least one second sensor signal in response to an illumination of the second light-sensitive area 148 by the light beam 122, wherein the first light-sensitive area 144 is smaller than the second light-sensitive area 148.

For example, the surface area of the first light-sensitive area 144 may be smaller than the surface area of the second light-sensitive area 148, such as by at least a factor of 0.9, e.g. at least a factor of 0.7 or even by at least a factor of 0.5. As an example, both the first light-sensitive area 144 and the second light-sensitive area 148 may have the shape of a square or of a rectangle, wherein side lengths of the square or rectangle of the first light-sensitive area are smaller than corresponding side lengths of the square or rectangle of the second light-sensitive area. Alternatively, as an example, both the first light-sensitive area 144 and the second light-sensitive area 148 may have the shape of a circle, wherein a diameter of the first light-sensitive area 144 is smaller than a diameter of the second light-sensitive area 148. Again, alternatively, as an example, the first light-sensitive area may have a first equivalent diameter, and the second light-sensitive area may have a second equivalent diameter, wherein the first equivalent diameter is smaller than the second equivalent diameter.

For example, the optical sensors 138 may be partial diodes of a segmented diode, with a center of the segmented diode being off-centered from the optical axis 136. The optical sensors 138 may be partial diodes of a bi-cell or quadrant diode and/or comprise at least one CMOS sensor. Bi-cell diodes or quadrant diodes are widely commercially available at low cost, and driving schemes for these bi-cell diodes or quadrant diodes are generally known. Bi-cell and quadrant diodes may have two or four separate light sensitive areas 140, in particular two or four active areas. As an example, the bi-cell diodes may each form independent diodes having the full functionality of a diode. As an example, each of the bi-cell diodes may have a square or rectangular shape, and the two diodes may be placed in one plane such that the two partial diodes, in total, form a 1×2 or 2×1 matrix having a rectangular shape. Generally, however, the optical sensors 138 specifically may be partial diodes of a quadrant diode, with a center of the quadrant diode being off-centered from the optical axis of the transfer device. As an example, in a quadrant diode the four partial diodes may each form independent diodes having the full functionality of a diode. As an example, the four partial diodes may each have a square or rectangular shape, and the four partial diodes may be placed in one plane such that the four partial diodes, in total, form a 2×2 matrix having a rectangular or square shape. In a further example, the four partial diodes, in total, may form a 2×2 matrix having a circular or elliptical shape. The partial diodes, as an example, may be adjacent, with a minimum separation from one another. As an example, the center of the bi-cell diodes, which may be an intersection of the geometrical centers of the optical sensors of the bi-cell diode, may be off-centered from the optical axis by at least 0.01 mm, more preferably by at least 0.1 mm, more preferably by at least 1.0 mm or even 2.0 mm. Thus, as a further example, the center of the center of the bi-cell diodes may be off-centered from the optical axis by a factor of at least 0.0001 times the maximum extent of the light sensitive area orthogonal to the optical axis, preferably by a factor of at least 0.001, more preferably by a factor of at least 0.005 times the maximum extent of the light sensitive area orthogonal to the optical axis.

In case a quadrant diode is used, having a 2×2 matrix of partial diodes, the center of the quadrant diode specifically may be off-centered or offset from the optical axis of the transfer device of the receiver unit. Thus, as an example, the center of the quadrant diodes, which may be an intersection of the geometrical centers of the optical sensors of the quadrant diode, may be off-centered from the optical axis by at least 0.1 mm, more preferably by at least 0.5 mm, more preferably by at least 1.0 mm or even 2.0 mm. Thus, as a further example, the center of the center of the quadrant diodes may be off-centered from the optical axis by a factor of at least 0.0001 times the maximum extent of the light sensitive area orthogonal to the optical axis, preferably by a factor of at least 0.001, more preferably by a factor of at least 0.005 times the maximum extent of the light sensitive area orthogonal to the optical axis. Similarly, when using other types of optical sensors setups having a plurality of optical sensors 138, an overall center of the optical sensors 138 may be offset from the optical axis by the same distance. Generally, the light-sensitive areas 140 of the optical sensors 138 may have an arbitrary surface area or size. Preferably, however, specifically in view of a simplified evaluation of the sensor signals, the light-sensitive areas of the optical sensors are substantially equal, such as within a tolerance of less than 10%, preferably less than 5% or even less than 1%. This, specifically, is the case in typical commercially available quadrant diodes. As an example, commercially available quadrant photodiodes may be integrated in order to provide four optical sensors 138, such as one or more quadrant photodiodes available from Hamamatsu Photonics Deutschland GmbH, D-82211 Herrsching am Ammersee, Germany, such as quadrant Si PIN photodiodes of the type S4349, which are sensitive in the UV spectral range to the near IR spectral range. In case an array of optical sensors is used, the array may be a naked chip or may be an encapsulated array, such as encapsulated in a TO-5 metal package. Additionally or alternatively, a surface mounted device may be used, such as TT Electronics OPR5911 available from TT Electronics plc, Fourth Floor, St Andrews House, West Street Woking Surrey, GU21 6EB, England. It shall be noted that other optical sensors may also be used.

For example, the receiver unit may comprise at least one sensor element having a matrix of optical sensors 138, the optical sensors 138 each having a light-sensitive area. Each optical sensor 138 may be configured to generate at least one sensor signal in response to an illumination of the light-sensitive area 140 by the light beam 122 propagating from the sender unit 114 to the receiver unit 116. The matrix may be or may comprise a rectangular matrix having one or more rows and one or more columns. The rows and columns specifically may be arranged in a rectangular fashion. It shall be outlined, however, that other arrangements are feasible, such as nonrectangular arrangements. As an example, circular arrangements are also feasible, wherein the elements are arranged in concentric circles or ellipses about a center point. For example, the matrix may be a single row of pixels. Other arrangements are feasible. The optical sensors 138 of the matrix specifically may be equal in one or more of size, sensitivity and other optical, electrical and mechanical properties. The light-sensitive areas 140 of all optical sensors of the matrix specifically may be located in a common plane, the common plane preferably facing the sender unit, such that the light beam propagating from the sender unit 114 to the receiver unit 116 may generate a light spot on the common plane. As outlined above, the optical sensors specifically may be or may comprise photodetectors, preferably inorganic photodetectors, more preferably inorganic semiconductor photodetectors, most preferably silicon photodetectors. Specifically, the optical sensors may be sensitive in the infrared spectral range. All of the optical sensors 138 of the matrix or at least a group of the optical sensors 138 of the matrix specifically may be identical. Groups of identical optical sensors 138 of the matrix specifically may be provided for different spectral ranges, or all optical sensors may be identical in terms of spectral sensitivity. Further, the optical sensors 138 may be identical in size and/or with regard to their electronic or optoelectronic properties. The matrix may be composed of independent optical sensors 138. Thus, a matrix of inorganic photodiodes may be composed. Alternatively, however, a commercially available matrix may be used, such as one or more of a CCD detector, such as a CCD detector chip, and/or a CMOS detector, such as a CMOS detector chip. Thus, generally, the optical sensors 138 may form a sensor array or may be part of a sensor array, such as the above-mentioned matrix. Thus, as an example, the receiver unit 116 may comprise an array of optical sensors 138, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that $0.3 \leq m/n \leq 3$, such as by choosing m/n=1:1, 4:3, 16:9 or similar. As an example, the array may be a square array, having an equal number of rows and columns, such as by choosing m=2, n=2 or m=3, n=3 or the like. The matrix specifically may be a rectangular matrix having at least one row, preferably a plurality of rows, and a plurality of columns. As an example, the rows and columns may be oriented essentially perpendicular. Thus, as an example, tolerances of less than 20°, specifically less than 10° or even less than 5°, may be acceptable. In order to provide a wide range of view, the matrix specifically may have at least 10 rows, preferably at least 50 rows, more preferably at least 100 rows. Similarly, the matrix may have at least 10 columns, preferably at least 50 columns, more preferably at least 100 columns. The matrix may comprise at least 50 optical sensors 138, preferably at least 100 optical sensors 138, more preferably at least 500 optical sensors 138. The matrix may comprise a number of pixels in a multi-mega pixel range. Other embodiments, however, are feasible.

The receiver unit 114 comprises at least one evaluation device 150. The evaluation device 150 is configured for generating an output by monitoring at least one change of, firstly, the beam profile of the at least one light beam 122 upon traversing the at least one area of surveillance 124 by evaluating the sensor signals and, further, of at least one component of a location of the sender unit 116, wherein the component is determined with respect to the coordinate system of the transfer device 134, by evaluating a combined signal Q from the sensor signals.

The evaluation device 150 may be configured for generating the output based on the distance by photon ratio (DPR) technique which is described e.g. in WO 2018/091649 A1, WO 2018/091638 A1 and WO 2018/091640, the content of which is included by reference. The DPR technique allows distance measurements such as determining a longitudinal coordinate of the sender unit. In addition, the DPR technique also allows recognizing geometrical changes to the light beam 122 upon traversing the area of surveillance 124 such as partial coverage of the light beam 122. The combined signal Q may be generated by combining the sensor signals, in particular by one or more of dividing the sensor signals, dividing multiples of the sensor signals or dividing linear combinations of the sensor signals. In particular, the combined signal may be a quotient signal. The combined signal Q may be determined by using various means. As an example, a software means for deriving the combined signal, a hardware means for deriving the combined signal, or both, may be used and may be implemented in the evaluation device. Thus, the evaluation device 150, as an example, may comprise at least one divider 152, wherein the divider is configured for deriving the combined signal. The divider 152 may fully or partially be embodied as one or both of a software divider or a hardware divider.

The evaluation device may be configured for deriving the combined signal Q by one or more of dividing the sensor signals, dividing multiples of the sensor signals, dividing linear combinations of the sensor signals. The evaluation device may be configured for using at least one predetermined relationship between the combined signal Q and the longitudinal coordinate for determining the longitudinal coordinate. The determining of the at least one longitudinal coordinate of the sender unit may be performed by the at least one evaluation device. Thus, as an example, the relationship may be implemented in software and/or hardware, such as by implementing one or more lookup tables. Thus, as an example, the evaluation device may comprise one or more programmable devices such as one or more computers, application-specific integrated circuits (ASICs), Digital Signal Processors (DSPs), or Field Programmable Gate Arrays (FPGAs) which are configured to perform the above-mentioned evaluation, in order to determine the at least one longitudinal coordinate of the sender unit. Additionally or alternatively, however, the evaluation device may also fully or partially be embodied by hardware.

For example, the evaluation device 150 may be configured for deriving the combined signal Q by $$Q(z_O) = \frac{\int\int_{A_1} E(x, y; z_O)dxdy}{\int\int_{A_2} E(x, y; z_O)dxdy}$$

wherein x and y are transversal coordinates, A1 and A2 are areas of the beam profile of the light beam 122 at the position of the optical sensors 138, and $E(x,y,z_o)$ denotes the beam profile for the distance of the sender unit $z_o$. Area A1 and area A2 may differ. In particular, A1 and A2 are not congruent. Thus, A1 and A2 may differ in one or more of the shape or content. The beam profile may be a cross section of the light beam 122. The beam profile may be selected from the group consisting of a trapezoid beam profile; a triangle beam profile; a conical beam profile and a linear combination of Gaussian beam profiles. Each of the sensor signals may comprise at least one information of at least one area of the beam profile of the light beam. The light-sensitive areas 140 may be arranged such that a first sensor signal comprises information of a first area of the beam profile and a second sensor signal comprises information of a second area of the beam profile. The first area of the beam profile and second area of the beam profile may be one or both of adjacent or overlapping regions. The first area of the beam profile and the second area of the beam profile may be not congruent in area.

The evaluation device 150 may be configured to determine and/or to select the first area of the beam profile and the second area of the beam profile. The first area of the beam profile may comprise essentially edge information of the beam profile and the second area of the beam profile may comprise essentially center information of the beam profile. The beam profile may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. Preferably the center information has a proportion of edge information of less than 10%, more preferably of less than 5%, most preferably the center information comprises no edge content. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region. The first area of the beam profile may be area A2 and the second area of the beam profile may be area A1.

The edge information may comprise information relating to a number of photons in the first area of the beam profile and the center information may comprise information relating to a number of photons in the second area of the beam profile. The evaluation device 150 may be adapted for determining an area integral of the beam profile. The evaluation device 150 may be adapted to determine the edge information by integrating and/or summing of the first area. The evaluation device 150 may be adapted to determine the center information by integrating and/or summing of the second area. For example, the beam profile may be a trapezoid beam profile and the evaluation device may be adapted to determine an integral of the trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Additionally or alternatively, the evaluation device 150 may be adapted to determine one or both of center information or edge information from at least one slice or cut of the light spot. This may be realized, for example, by replacing the area integrals in the combined signal Q by line integrals along the slice or cut. For improved accuracy, several slices or cuts through the light spot may be used and averaged. In case of an elliptical spot profile, averaging over several slices or cuts may result in an improved distance information.

The evaluation device 150 may be configured to derive the combined signal Q by one or more of dividing the edge information and the center information, dividing multiples of the edge information and the center information, dividing linear combinations of the edge information and the center information. Thus, essentially, photon ratios may be used as the physical basis of the method. The evaluation device 150 may be configured for determining the longitudinal coordinate by evaluating the combined signal Q. The evaluation device 150 may be configured for using at least one predetermined relationship between the combined signal Q and the longitudinal coordinate. The predetermined relationship may be one or more of an empiric relationship, a semi-empiric relationship and an analytically derived relationship. The evaluation device 150 may comprise at least one data storage device for storing the predetermined relationship, such as a lookup list or a lookup table.

The combined signal Q can be used for determining manipulations such as willful and/or not intentional manipulations. The manipulation may be an arbitrary willful and/or not intentional intervention into the device 110 resulting in a change of one property of the light beam 122 such as a change of a length and/or direction of the beam path. The beam path from the sender unit 114 to the receiver unit 116 may change due to changes in the optical system such as due to one or more of water, scratches, introducing additional reflective elements, dirt, or even falseful arrangement of the components of the light barrier. Specifically, such changes may lead to a change in one or more of x-, y-, or z-position of the sender unit 114, the beam profile, the combined signal Q and the sensor signals of the optical sensors 138. Changes of a length of the beam path may be detectable by monitoring the combined signal Q, specifically changes of the combined signal Q. The combined signal Q can be used for determining a z-position of the sender unit. As the combined signal Q depends on the beam profile of the light beam 122, the combined signal Q can be used for determining changes in the beam profile. The evaluation device 150 may be configured to determine changes in the length of the beam path by determining and evaluating the combined signal Q as described e.g. in WO 2018/091649 A1, WO 2018/091638 A1 and WO 2018/091640 A1. The evaluation device 150 may be configured for monitoring the combined signal Q and for determining changes of the combined signal Q. The evaluation device may be configured for determining a manipulation based the determined change. For example, the evaluation device may be adapted for determining the longitudinal coordinate of the sender unit by evaluating the combined signal Q. In case the z-position of the sender unit was changed, e.g. by introducing additional reflective elements, the evaluation of the combined signal Q will result in a longitudinal coordinate which is different from a reference longitudinal coordinate. The evaluation device 150 may be configured for comparing the reference longitudinal coordinate and the measured longitudinal coordinate. The evaluation device 150 may be configured for indicating a manipulation if the reference longitudinal coordinate and the measured longitudinal coordinate differ, wherein differences within a tolerance range may be tolerated. Manipulations further may result in a change of the x- and/or y-position of the light beam impinges on the respective optical sensor and, thus, to changes of coverage, such as a partial coverage, of the light sensitive area 140 of the respective optical sensor 138. The combined signal Q can be used for detecting these geometrical changes of the light beam. Specifically, the evaluation device 150 may be configured for determining a change of the at least one transversal coordinate x and/or y of the sender unit by detecting geometrical changes of the light beam 122, such as by monitoring simultaneously the position of the center of gravity of the light spot and the total intensity of the light spot, whereas a change in at least one transversal coordinate x and/or y is likely in case the center of gravity position changes, while the total intensity of the light spot is unchanged. A combination of monitoring several parameters such as monitoring of the z-position in combination with monitoring the x- and/or y-position may allow enhancing reliability of the light barrier. The output may be an arbitrary indication about a change of a monitored parameter such as the beam profile of the light beam upon traversing the at least one area and/or of the at least one component of the location of the sender unit. The output may be and/or may comprise at least one output signal. The output may comprise at least one binary signal indicating whether or not a change is present. The output may comprise at least one information about the change such as an amount of difference, which parameter is changed, which parameter were monitored or the like.

The evaluation device 150 may further be designed for generating the at least one output by monitoring a change of the sensor signals of the optical sensors 138. The evaluation device 150 may be designed for generating the output by using at least one reference beam profile for the at least one light beam 122 generated by the illumination source 118 and at least one reference component for the at least one component of the location of the sender unit 114. One or more reference parameter selected from the group consisting of the reference beam profile, the reference component of location, the reference sensor signals, the reference combined signal Q may be pre-determined and/or pre-defined. The at least one reference beam profile and/or the at least one reference component of the location of the sender unit 114 and/or the reference sensor signals and/or the reference combined signal Q may be stored during a teaching phase. The evaluation device 150 may comprise at least one storage unit in which one or more of the reference beam profile, the reference component of location, the reference sensor signals, the reference combined signal Q may be stored such as in a table or lookup table.

The evaluation device 150 may be configured to compare the monitored parameter with the respective reference parameter. A change may be determined by using at least one mathematical operation such as subtracting the respective reference value or profile from the determined value or profile or vice versa, respectively. The evaluation device 150 may be configured to determine if the difference between the reference parameter and the monitored parameter exceeds at least one threshold value and in case the difference exceeds the threshold to indicate a change. Manipulations may be defined as changes in one or more of x-, y-, or z-position, the combined signal Q and the sensor signals of the optical sensors 138, specifically, if the change concerns one optical sensor 138 while the other sensor signal remains unchanged.

The combination of several surveillance parameters such as beam profile, combined signal Q, sensor signals, at least one component of location may allow providing a light barrier with enhanced reliability against manipulations. Specifically, the light barrier may be more reliable against reflections from highly reflective environment such as metal sheets or surfaces. Information from the beam profile or the x-y position may be used for safety monitoring functions. As an example, changes of the beam profile may also indicate dirt on the optical system that may cause a failure of the safety function. Further, exhaust gases, steam, or particle emissions that may cause a failure of the system may also be detected by monitoring the beam profile. Monitoring the z-positions such as the longitudinal coordinate of the sender unit 114 may also allow recognizing a shortening of the distance the light is supposed to have traveled. This may indicate a change in the optical system such as due to water, scratches, manipulations, or dirt, or it may indicate a falseful reassembly of the light barrier.

The evaluation device 150 may be configured for initiating at least one action based on the output, wherein the at least one action is selected from at least one of: providing at least one information such as a safety function, generating at least one warning, inducing at least one instruction, changing an output signal. Specifically, the evaluation device actuates at least one safety function based on the output. The information may be a warning, a safe-shutdown, an emergency warning, a violation information or the like. The evaluation device 150 may be configured for assigning the information to a time of event and for storing a combination of the information with the time of event in an information log. The warning may comprise a visual, an audible or a haptic warning signal. The instruction may comprise initiating a shutdown of at least one apparatus, such as of a machine. The evaluation device 150 may be configured that not every change in one of the monitored parameters may lead to a shutdown and/or warning and/or change of an output signal, but may lead in each case to an information about the origin of the change such as the changed parameter.

The evaluation device 150 may comprise at least one safety unit 154 comprising at least one electrosensitive protective equipment (ESPE) 156. The ESPE may comprise a plurality of elements which are configured for protective tripping and/or presence sensing purposes such as a sensing function and/or a control or monitoring function. Specifically, the ESPE may comprise at least one output signal switching device (OSSD) 158. The OSSD 158 may be connected to a machine control system of an apparatus. In case the evaluation device has actuated the safety function, specifically has initiated the action as described above, the machine control system responds by going into a safe state such as an OFF state. The apparatus may comprise one or more of at least one electrically powered machine primary control element (MPCE) configured for controlling normal operation of the apparatus, at least one machine secondary control element (MSCE) which is a further machine control element configured for removing power source from prime mover of hazardous parts, at least one final switching device (FSD), at least one secondary switching device (SSD), normally closed (NC) contacts and normally open (NO) contacts. The FSD may be configured in response to the indication from the OSSD 158 to interrupt the circuit connecting the machine control system to the machine primary control system. In this situation, the SSD may be configured for performing a back-up function by going to the OFF state and initiating further machine control actions such as de-energizing the MSCE.

Using the DPR technique may be advantageous since it is possible to use commonplace and cheap Si-sensors such as bi-cells or quadrant diodes that are much faster and have a larger bandwidth than for example FiP sensors. Further Si-sensors may be more homogeneous and entirely intensity independent, whereas in FiP devices homogeneity requirements can make fabrication costly and intensity independence of the FiP quotient requires additional technical effort. For possible embodiments of sensors using DPR technique reference is made to WO 2018/091649 A1, WO 2018/091638 A1 and WO 2018/091640 A1, the content of which is included by reference.

Figure 2:
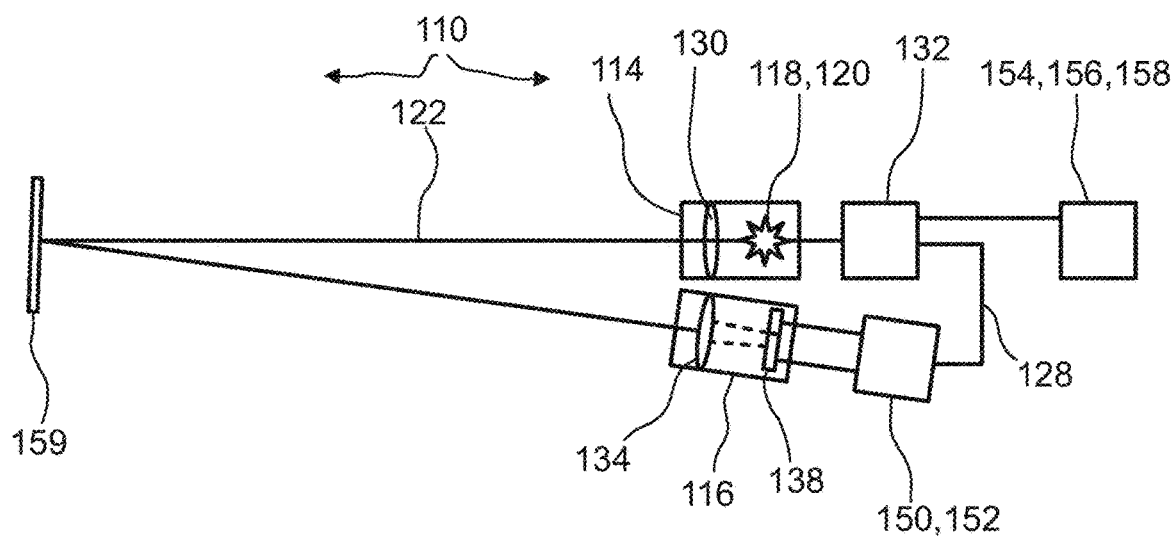
FIG. 2 shows a second exemplary embodiment of the device.

FIG. 2 shows an embodiment of the device 110, wherein the device 110 is designed as reflective light barrier. In this embodiment the sender unit 114 and the light-sensitive areas 140 of the optical sensors 138 may be oriented towards a reflective target 159. Thus, the reflective target 159, sender unit 114 and receiver unit 116 may be arranged such that the light beam 122 propagates from the sender unit 114 to the reflective target 159 and such that the light beam is reflected by the reflective target 159 to the receiver unit 116. With respect to embodiments and design of the sender unit 114 and receiver unit 116 reference is made to the description of FIG. 1 above.

Figure 3:
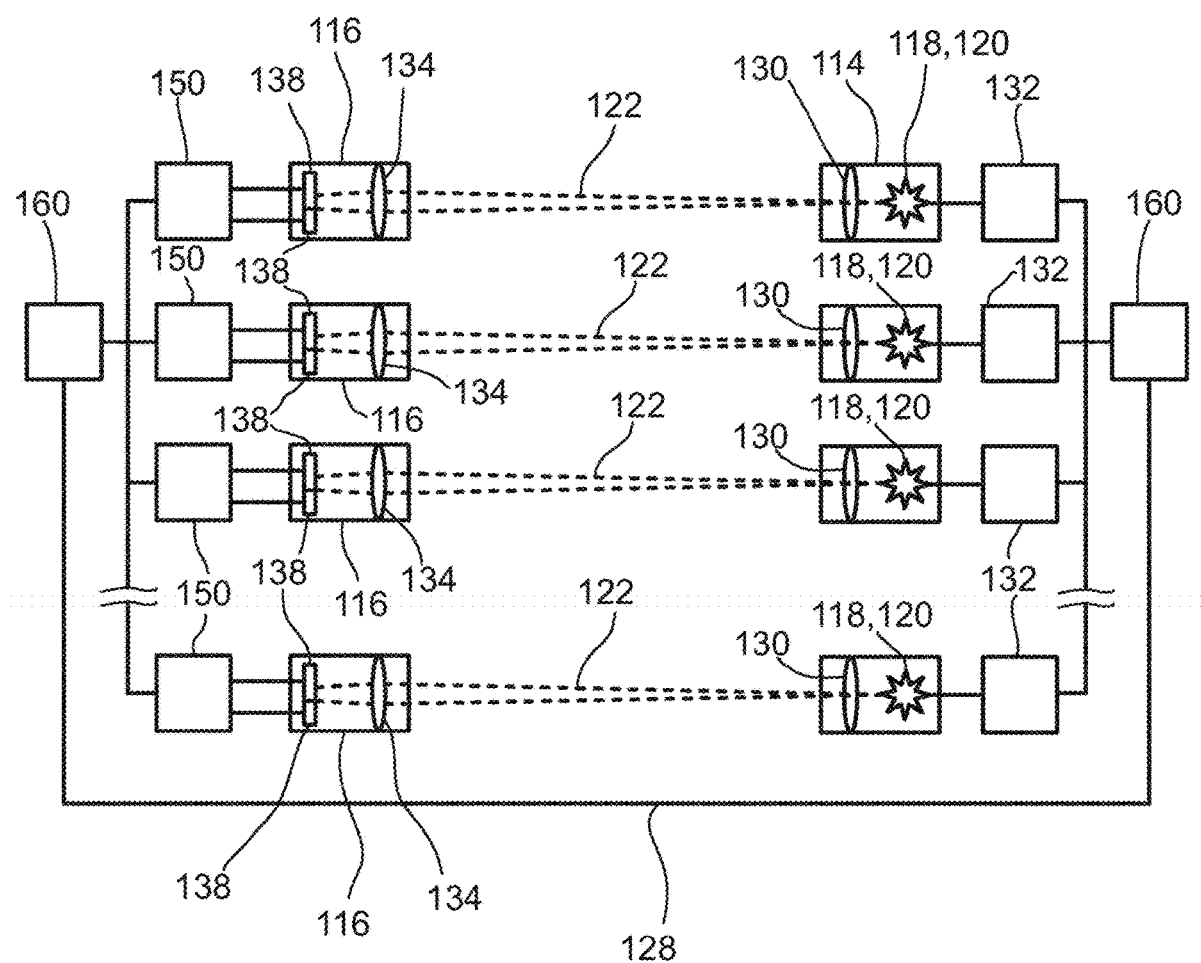
FIG. 3 shows a third exemplary embodiment of the device.

FIG. 3 shows an embodiment of the device 110, wherein the device 110 is designed as light curtain. The device 110 may comprise a plurality of sender units 114 and/or receiver units 116. With respect to embodiments and design of the sender unit 114 and receiver unit 116 reference is made to the description of FIG. 1 above. The receiver units 116 may be configured to detect the light beams 122 having traversed the area of surveillance 124 of more than one sender unit 114 simultaneously or non-simultaneously. To ensure safe operation, the receiver unit 116 may be configured to monitor the presence of the light beam 122 and/or the beam profile and/or at least one of x-position, y-position, z-position of each sender unit 114 and send out an information in case of a change. In case of a plurality of receiver units 114 each receiver unit 114 may comprise a separate evaluation device 150 and/or the receiver units 114 may comprise a central evaluation device 160 which may be configured to evaluate the sensor signals of each of the receiver units using for example a multiplexing scheme.

The sender units 114 each may comprise at least one illumination sources 118. Each of the illumination sources 118 may be designed for being modulated by an individual modulation pattern, the individual modulation pattern may be different with respect to each other. The sender units 114 each may comprise an individual modulation source 132 for each illumination source 118, or wherein the sender units 114 further comprises a central modulation device 162 comprising a multiplexer being designated for switching an individual impingement of the illumination sources by a single modulation source. The evaluation devices 150, specifically the central evaluation device 160, is designated for assigning an individual modulation pattern to an individual illumination source 118.

LIST OF REFERENCE NUMBERS 110 device for optical surveillance
112 area
114 sender unit
116 receiver unit
118 illumination source
120 light source
122 light beam
124 area of surveillance
126 optical axis
128 connection
130 transfer device
132 modulation source
134 transfer device
136 optical axis
138 optical sensor
140 light-sensitive area
142 first optical sensor
144 first light-sensitive area
146 second optical sensor 148 second light-sensitive area
150 evaluation device
152 divider
156 ESPE
158 OSSD
159 reflective target
160 central evaluation device
162 central modulation device

The invention claimed is:

1. A device (110) for optically surveilling at least one area (112), the device (110) comprising a sender unit (114) and a receiver unit (116),
- wherein the sender unit (114) has at least one illumination source (118), wherein the illumination source (118) is designed to generate at least one light beam (122) having a beam profile, wherein each light beam (122) is designated for propagating to the receiver unit (116), thereby traversing at least one area for surveillance (124);
- wherein the receiver unit (116) comprises:
  - at least one transfer device (134), wherein the transfer device (134) has at least one focal length in response to the at least one incident light beam (122) propagating from the illumination source (118) to at least two optical sensors (138), wherein the transfer device (134) has an optical axis (136), wherein the transfer device (134) constitutes a coordinate system, wherein a longitudinal coordinate l is a coordinate along the optical axis and wherein d is a spatial offset from the optical axis (136);
  - the at least two optical sensors (138), wherein each of the at least two optical sensors (138) has at least one light sensitive area (140), wherein each optical sensor (138) is designed to generate at least one sensor signal, wherein the sensor signal comprises at least one information of at least one area of the beam profile of the light beam, in response to an illumination of its respective light-sensitive area (140) by the light beam (122), wherein two of the optical sensors (138) are arranged in a manner that the light-sensitive areas (140) of the two optical sensors (138) differ in at least one of: their longitudinal coordinate, their spatial offset, or their surface areas;
  - and at least one evaluation device (150), wherein the evaluation device (150) is configured to determine and/or to select a first area of the beam profile and a second area of the beam profile, wherein the first area of the beam profile comprises essentially edge information of the beam profile and the second area of the beam profile comprises essentially center information of the beam profile for generating an output by monitoring at least one change of, firstly, the beam profile of the at least one light beam (122) upon traversing the at least one area of surveillance (124) by evaluating the sensor signals and, further, of at least one component of a location of the sender unit (114), wherein the component is determined with respect to the coordinate system of the transfer device (134), by evaluating a combined signal Q from the sensor signals.

2. The device (110) according to claim 1, wherein the evaluation device (150) is further configured for initiating at least one action based on the output, wherein the at least one action is selected from the group consisting of providing at least one information, generating at least one warning, inducing at least one instruction, and changing an output signal.

3. The device (110) according to claim 2, wherein the evaluation device (150) is further configured for assigning the information to a time of event and for storing a combination of the information with the time of event in an information log.

4. The device (110) according to claim 2, wherein the warning comprises a visual, an audible or a haptic warning signal.

5. The device (110) according claim 2, wherein the instruction comprises initiating a shutdown of at least one apparatus.

6. The device (110) according to claim 1, wherein the sender unit (114) further comprises at least one modulation source (132), the modulation source (132) being configured for generating a modulation pattern in a manner that the modulation source (132) impinges the illumination source (118) to generate at least one light beam (122) carrying the modulation pattern.

7. The device (110) according to claim 6, wherein the modulation pattern is selected from the group consisting of: a pseudo random modulation pattern, an Aiken code, a BCD code, a Gillham code, a Stibitz code, a one-hot code, and a gray code.

8. The device (110) according to claim 6, wherein the sender unit comprises at least two illumination sources (118), wherein each of the illumination sources (118) is designed for being modulated by an individual modulation pattern, the individual modulation pattern of two illumination sources (118) being different with respect to each other.

9. The device (110) according to claim 8, wherein the evaluation device (150) is designated for assigning an individual modulation pattern to an individual illumination source (118).

10. The device (110) according to claim 6, wherein the sender unit (114) comprises an individual modulation source (132) for each illumination source (118), or wherein the sender unit (114) further comprises a multiplexer designated for switching an individual impingement of at least two of the illumination sources (118) by a single modulation source (132).

11. The device (110) according to claim 1, further comprising a connection (128) between the sender unit (114) and the receiver unit (116), wherein the connection (128) is designed for providing synchronization between the sender unit (114) and the receiver unit (116).

12. The device (110) according to claim 1, further comprising at least one reflective target (159) designed for being impinged by the at least one light beam (122) propagating from the at least one illumination source (118) to the at least two optical sensors (138).

13. The device (110) according to claim 1, wherein two of the optical sensors (138) are arranged as:
- at least one first optical sensor (142) having a first light-sensitive area (144), wherein the first optical sensor (142) is configured to generate at least one first sensor signal in response to an illumination of the first light-sensitive area (144) by the light beam (122) propagating from the sender unit (114) to the receiver unit (116); and
- at least one second optical sensor (146) having a second light-sensitive area (148), wherein the second optical sensor (146) is configured to generate at least one second sensor signal in response to an illumination of the second light-sensitive area (148) by the light beam (122), wherein the first light-sensitive area (144) is smaller than the second light-sensitive area (148);

wherein the evaluation device (150) is configured for generating the output by evaluating the first and second sensor signals.

14. The device (110) according to claim 13, wherein the evaluation device (150) is further designed for generating the at least one output by monitoring a change of the first sensor signal or of the second sensor signal.

15. The device (110) according to claim 1, wherein the sender unit (114) and the receiver unit (116) are arranged with respect to each other in a manner that the sensor signal of at least one of the optical sensors is a highest sensor signal.

16. The device (110) according to claim 1, wherein the evaluation device (150) is further designed for generating the output by using at least one reference beam profile for the at least one light beam generated by the illumination source (118) and at least one reference component for the at least one component of the location of the sender unit (114).

17. The device (110) according to claim 16, wherein the at least one reference beam profile and the at least one reference component are stored during a teaching phase.

18. A method of using the device (110) according to claim 1, the method comprising using the device (110) for a purpose selected from the group consisting of: monitoring at least one apparatus located in a surveillance area; distinguishing between a willful manipulation from a not intentional manipulation related to the at least one apparatus located in the surveillance area; and indicating a failure of a safety function.

19. A method for optically surveilling at least one area by using at least one device comprising a sender unit (114) and a receiver unit (116), the method comprising the following steps:
    providing a sender unit (114) having at least one illumination source (118), wherein the illumination source (118) is designed to generate at least one light beam (122), each light beam (122) having a beam profile, wherein each light beam (122) is designated for propagating to the receiver unit (116), thereby traversing the at least one area for surveillance (124);
    providing a receiver unit (116) having at least one transfer device (134), at least two optical sensors (138) and an evaluation device (150) configured to determine and/or to select a first area of the beam profile and a second area of the beam profile, wherein the first area of the beam profile comprises essentially edge information of the beam profile and the second area of the beam profile comprises essentially center information of the beam profile, wherein the transfer device (134) has at least one focal length in response to the at least one incident light beam (122) propagating from the illumination source (118) to at least two optical sensors (138), wherein the transfer device (134) has an optical axis (136), wherein the transfer device (134) constitutes a coordinate system, wherein a longitudinal coordinate l is a coordinate along the optical axis (136) and wherein d is a spatial offset from the optical axis (136), wherein each optical sensor (138) has at least one light sensitive area (140), wherein each optical sensor (138) is designed to generate at least one sensor signal, wherein the sensor signal comprises at least one information of at least one area of the beam profile of the light beam, in response to an illumination of its respective light-sensitive area (140) by the light beam (122), wherein two of the optical sensors (138) are arranged in a manner that the light-sensitive areas (140) of the two optical sensors (138) differ in at least one of: their longitudinal coordinate, their spatial offset, or their surface areas;
    generating the at least one light beam (122) for illuminating each of the light-sensitive areas (140) of the at least two optical sensors (138) of the receiver unit (116) with the light beam (122) propagating from the sender unit (114) to the receiver unit (116), thereby traversing at least one area for surveillance (124), wherein, thereby, each of the light-sensitive areas (140) generates at least one sensor signal; and
    evaluating the sensor signals, thereby, generating an output by monitoring at least one change of, firstly, the beam profile of the at least one light beam (122) upon traversing the at least one area of surveillance (124) by evaluating the sensor signals and, further, of at least one component of a location of the sender unit (114), wherein the component is determined with respect to the coordinate system of the transfer device (134), by evaluating a combined signal Q from the sensor signals.

20. The method according to claim 19, further comprising initiating at least one action based on the output, wherein the at least one action is selected from the group consisting of providing at least one information, generating at least one warning, inducing at least one instruction, and changing an output signal.

* * * * *